US012564539B2

(12) United States Patent
Menguy et al.

(10) Patent No.: US 12,564,539 B2
(45) Date of Patent: Mar. 3, 2026

(54) DEVICES AND METHODS FOR TREATING A BREATHING-RELATED SLEEP DISORDER, METHODS OF USE AND CONTROL PROCESSES FOR SUCH A DEVICE

(71) Applicants: BREAS MEDICAL AB, Mölnlycke (SE); INSTITUT NATIONAL DE LA SANTE ET DE LA RECHERCHE MEDICALE (INSERM) (EPST), Paris (FR); UNIVERSITE CLAUDE BERNARD LYON 1 (UCBL), Villeurbanne (FR); CENTRE LEON-BERARD, Lyons (FR)

(72) Inventors: Didier Menguy, Saint-Georges-d'Espéranche (FR); Jean-Yves Chapelon, Villeurbanne (FR); Stefan Catheline, Lyons (FR); Ali Zorgani, Villeurbanne (FR)

(73) Assignees: BREAS MEDICAL AB, Mölnlcke (SE); INSERM (INSTITUT NATIONAL DE LA SANTE ET DE LA RECHERCHE MEDICALE), Paris (FR); UNIVERSITE CLAUDE BERNARD LYIN 1 (UCBL), Villeurbanne (FR); CENTRE LYON-BERARD, Lyons (FR)

( * ) Notice: Subject to any disclaimer, the term of this patent is extended or adjusted under 35 U.S.C. 154(b) by 1024 days.

(21) Appl. No.: 17/282,384

(22) PCT Filed: Oct. 3, 2018

(86) PCT No.: PCT/IB2018/001232
§ 371 (c)(1),
(2) Date: Apr. 2, 2021

(87) PCT Pub. No.: WO2020/070535
PCT Pub. Date: Apr. 9, 2020

(65) Prior Publication Data

US 2021/0346238 A1 Nov. 11, 2021

(51) Int. Cl.
*A61H 23/02* (2006.01)

(52) U.S. Cl.
CPC . *A61H 23/0263* (2013.01); *A61H 2201/1609* (2013.01); *A61H 2201/1619* (2013.01);
(Continued)

(58) Field of Classification Search
CPC ...... A61H 23/02; A61H 23/04; A61H 39/007; A61H 2201/5005; A61B 5/4818
See application file for complete search history.

(56) References Cited

U.S. PATENT DOCUMENTS 5,555,891 A * 9/1996 Eisenfeld ............... A61B 5/486 600/595
6,155,976 A 12/2000 Sackner et al.
(Continued)

FOREIGN PATENT DOCUMENTS

CN 107280672 A 10/2017
JP 2012011064 A 1/2012
(Continued)

*Primary Examiner* — Joseph D. Boecker
*Assistant Examiner* — Thomas W Greig
(74) *Attorney, Agent, or Firm* — WCF IP

(57) ABSTRACT

The present teachings relate to a device and a method for treating a subject, wherein an actuator is configured for external mechanical contact with the subject, wherein a control unit is configured to control the actuator to provide at least one burst of a primary vibration, and wherein the primary vibration has one or several frequencies, or a frequency varying, within an operative frequency range contained in a range from 5 Hz to 1000 Hz, in order for the device to generate a shear wave which propagates inside the body of the subject. In addition, the present teachings relate
(Continued)

to use of a device of the present teachings to treat a breathing-related sleep disorder, including snoring, OSA, UARS, or OHS.

10 Claims, 13 Drawing Sheets

(52) U.S. Cl.
CPC .................. *A61H 2201/165* (2013.01); *A61H 2201/5005* (2013.01); *A61H 2230/201* (2013.01); *A61H 2230/425* (2013.01)

(56) References Cited

U.S. PATENT DOCUMENTS 8,292,835 B1 * 10/2012 Cimino .................... A61N 7/02 601/3
2006/0015045 A1 * 1/2006 Zets ................... A61H 23/0218 601/78
2007/0213645 A1 9/2007 Zumeris
2013/0041296 A1 * 2/2013 Tass .......................... A61F 7/00 601/46
2016/0158091 A1 * 6/2016 Amblard .............. A61B 5/0205 601/48
2016/0158097 A1 * 6/2016 Harper ...................... A61F 5/56 601/48
2016/0228324 A1 * 8/2016 Garteiser ............... A61H 23/04
2016/0238040 A1 * 8/2016 Gallo ..................... A61B 34/74
2017/0348184 A1 * 12/2017 Pisharodi ............. A61H 23/004
2020/0054228 A1 * 2/2020 Puleo ................... A61B 5/6823

FOREIGN PATENT DOCUMENTS

JP 2013504407 A 2/2013
WO 2018132646 A1 7/2018

* cited by examiner

DEVICES AND METHODS FOR TREATING A BREATHING-RELATED SLEEP DISORDER, METHODS OF USE AND CONTROL PROCESSES FOR SUCH A DEVICE

During sleep, most of the body's systems are in an anabolic state, helping to restore the immune, nervous, skeletal, and muscular systems; these are vital processes that maintain mood, memory, and cognitive performance, and play a large role in the function of the endocrine and immune systems. The internal circadian clock promotes sleep daily at night. The diverse purposes and mechanisms of sleep are the subject of substantial ongoing research. The advent of artificial light has substantially altered sleep timing in industrialized countries.

Humans may suffer from various sleep disorders, including dyssomnias, such as insomnia, hypersomnia, narcolepsy, and sleep apnea; parasomnias, such as sleepwalking and REM behavior disorder; bruxism; and circadian rhythm sleep disorders.

Obstructive sleep apnea is a condition in which major pauses in breathing occur during sleep, disrupting the normal progression of sleep and often causing other more severe health problems. Apneas occur when the muscles around the patient's airway relax during sleep, causing the airway to collapse and block the intake of oxygen. Obstructive sleep apnea is more common than central sleep apnea. As oxygen levels in the blood drop, the patient then comes out of deep sleep in order to resume breathing. When several of these episodes occur per hour, sleep apnea rises to a level of seriousness that may require treatment.

The symptoms of OSA may include the collapse of the upper airway due to an abnormal relaxation of the muscles and soft tissues of the throat. The collapse may block the airway and interrupt breathing. After a few seconds, the brain detects what is happening and triggers micro arousals. This is known as apnea. Additional episodes may include very slow and shallow breathing. This is called hypopnea and happens when the throat is partly blocked.

People with OSA can experience hundreds of apnea and hypopnea episodes per night. These interrupt their deep sleep pattern by breaking it into much smaller sections of shallower sleep sessions, which can leave their body unsatisfied in the morning because the brain had been deprived of oxygen.

Snoring is a common finding in people with this syndrome. Snoring is the turbulent sound of air moving through the back of the mouth, nose, and throat. Although not everyone who snores is having trouble breathing, snoring in combination with other risk factors has been found to be highly predictive of OSA. The loudness of the snoring is not indicative of the severity of obstruction, however. If the upper airways are tremendously obstructed, there may not be enough air movement to make much sound. Even the loudest snoring does not mean that an individual has sleep apnea syndrome. The sign that is most suggestive of sleep apneas occurs when snoring stops. The affected subjects typically wake up feeling unrefreshed. During the day they feel tired, which can trigger irritability and concentration issues. In some cases, subjects can suffer from headaches and forgetfulness, which in turn can be associated with anxiety and depression.

The degree of severity may be measured by the AHI (Apnea Hypopnea Index). This index reflects the number of apneas and hypopneas per hour. Considering the type of OSA condition, different treatment options can be considered. Approximately 7.5% of the population is estimated to suffer from moderate to severe OSA with AHI>15.

OSA is not only disruptive to the daily life of a subject and partner but also has many other health or safety implications, including higher risk of cardiovascular diseases, high blood pressure, and sleepiness and reduced concentration while awake. The high blood pressure, if left untreated, can increase the risk of other serious problems such as type 2 diabetes, obesity, heart attack, or/and stroke. And the sleepiness and reduced concentration while driving will impose safety risk to the subject and/or others.

Key physiological indicators in sleep include EEG of brain waves, electrooculography (EOG) of eye movements, and electromyography (EMG) of skeletal muscle activity. Simultaneous collection of these measurements is called polysomnography and can be performed in a specialized sleep laboratory. Diagnosis of OSA can be complex. After ruling out other conditions, a subject may be requested to have an overnight sleep test, which will either be at a sleep test center or at home in a home sleep study. Many electrodes may be placed on a subject's skin which measure different body functions, including the breathing, heart rate, chest and abdomen movements, muscle tone, brainwaves and airflow in the mouth and nose, while the subject sleeps.

Sleep apnea may be diagnosed by the evaluation of symptoms, risk factors and observation, (e.g., excessive daytime sleepiness and fatigue) but the gold standard for diagnosis is a formal sleep study (polysomnography, or sometimes reduced channels home based test polygraphy). A study can establish reliable indices of the disorder, derived from the number and type of event per hour of sleep (Apnea Hypopnea Index (AHI), or Respiratory Disturbance Index (RDI)), associated to a formal threshold, above which a patient is considered as suffering from sleep apnea, and the severity of their sleep apnea can then be quantified. Mild OSA (Obstructive Sleep Apneas) ranges from 5 to 14.9 events per hour, moderate OSA falls in the range of 15-29.9 events per hour, and severe OSA would be a patient having over 30 events per hour. Examples of the treatments include a Continuous Positive Airway Pressure (CPAP) machine, lifestyle modifications, mouth guards, surgical procedures, phrenic nerve stimulation devices, or other less frequently used treatments.

CPAP is the current gold standard for the treatment of OSA subjects in mild and severe conditions. CPAP was developed in the 1980s and generally can involve constantly pushing air into the upper airway to keep it open. The system can be made of a machine pushing air at a constant or automated pressure and a mask (oral or facial) the subject needs to put on his face and wear all night. The subject has to learn to sleep with a facemask and in a certain position.

There are many disadvantages to this therapeutic option, which makes good compliance to this therapy fairly low. On top of the potential impact on intimacy, many subjects complain about uncomfortable nights when using the machine. This is due to the constant vibrating noise as well as further complications such as system leaks, dry nose, red eye, nasal congestion and mask marks on the face. This leads to poor compliance with as many as 20% of diagnosed subjects refusing the therapy altogether, and up to 50% of subjects non-compliant to their CPAP therapy.

In low severity cases, it may be sufficient to change a subject's lifestyle by losing weight, avoiding excessive alcohol drinking and sleeping in a proper bed position for greater air intake.

A dedicated mouth guard, known as a mandibular advancement device (MAD), can be prescribed to hold the jaw and tongue in a forward position, which can create more space at the back of the throat. However, many subjects complain that it is uncomfortable about sleeping constantly with a mouth guard and adherence is likely to fall with time. Additionally, not all subjects respond to this therapy and the indications are limited.

In severe OSA cases or where there is a physical abnormality such as very large tonsils which block breathing, surgical intervention may be required. There are many surgical procedures, some of which are radical. Apart from being traumatic, there's no guarantee that surgical procedures (such as reshaping the soft palate and pharynx) will have a beneficial effect in the long term.

In the phrenic nerve stimulation treatment, a system delivers small electrical pulses to one of the phrenic nerves that sends signals from the brain to the diaphragm. The diaphragm responds to these signals and is designed to restore a more normal breathing pattern. This natural breathing pattern may allow better oxygenation, less activation of the sympathetic nervous system, and improved sleep, which all lead to improved cardiovascular health. Generally, the system activates automatically during sleep. A physician can monitor information through the portable tablet programmer and can non-invasively change the settings if required. Nevertheless, it is an invasive system and with a few trials and feedback and not very well accepted by the subject.

OSA is one of the most common breathing-related sleep disorders and there are other breathing-related sleep disorders that do not have adequate methods to be diagnosed and/or treated. Thus, there exists the need to diagnose and treat breathing-related sleep disorders by using novel technologies.

US-2017/0165101 discloses a device and a method to alleviate obstructive sleep apnea and/or snoring and/or insomnia through the use of vibration. The device may be worn in one of several configurations to stimulate the hypoglossal and/or glossopharyngeal nerves, the genioglossus muscle and other muscles of the neck and throat to prevent airway obstruction during sleep.

US-2013/0030257 relates to a non-contact physiological motion sensor and a monitor device that can incorporate use of the Doppler effect to extract information related to the cardiopulmonary motion in one or more subjects. The extracted information can be used, for example, to determine apneic events and/or snoring events and/or to provide apnea or snoring therapy to subjects when used in conjunction with an apnea or snoring therapy device.

SUMMARY

The invention relates to a device, said device comprising at least a first actuator, and a control unit. The first actuator is configured for external mechanical contact with a subject. The control unit is configured to control the first actuator to provide at least one burst of a first primary vibration. The first primary vibration has one or several frequencies, or a frequency varying, within an operative frequency range contained in a range from 5 Hz to 1000 Hz, in order for the device to generate a shear wave inside the body of the subject. Such device may thus be used for treating a subject.

The invention also relates to a control process for a device comprising at least a first actuator, and a control unit, wherein the first actuator is configured for external mechanical contact with a subject. The control process is configured to control the first actuator to provide at least one burst of a first primary vibration. The first primary vibration has one or several frequencies, or a frequency varying, within an operative frequency range contained in a range from 5 Hz to 1000 Hz, in order for the device to generate a shear wave inside the body of the subject. Such control process may thus be used for treating a subject with the device.

According to optional features of such a device or of such a control process, taken alone or in combination:

The device may comprise several actuators including said first actuator and at least a second actuator configured for external mechanical contact with the subject; the control unit and/or control process may be configured to control the second actuator to provide at least one burst of a second primary vibration; and the second primary vibration may have one or several frequencies, or a frequency varying, within the operative frequency range contained in a range from 5 Hz to 1000 Hz.

The first and second primary vibrations may be synchronous, or may exhibit a phase shift.

The first and second primary vibrations may have the same amplitude and the same frequency content, or may have a different amplitude and/or a different frequency content.

The primary vibration may be a periodic vibration which has a single constant primary frequency during a given burst, the single constant primary frequency being contained in the operative frequency range contained in a range from 5 Hz to 1000 Hz.

The primary vibration may have a frequency content spanning a delivered frequency band contained in, or overlapping, the operative frequency range contained in a range from 5 Hz to 1000 Hz.

The primary vibration may be or may contain a vibration which, during a given burst, is a summation of at least several distinct periodic sub-vibrations, several of which each have a distinct primary frequency, the several single primary frequencies being contained in the operative frequency range and spanning the delivered frequency band.

The primary vibration may be or may contain a vibration which, within each of several distinct time intervals, is a periodic vibration which has a single primary frequency during a given interval, the several single primary frequencies being distinct between two successive time intervals, being contained in the operative frequency range, and spanning the delivered frequency band.

The primary vibration may be or may contain a sweeping vibration having a varying frequency which, during a given time interval, has a non-constant frequency spanning the delivered frequency band.

The sweeping vibration may have a frequency which, during a given time interval, varies as a function of time.

The sweeping vibration may have a frequency which, during a given time interval, varies as a continuous function of time.

The delivered frequency band may span at least 10 Hz, or at least 20 Hz, or at least 40 Hz, or at least from 40 to 80 Hz, or at least from 30 to 100 Hz or at least from 15 Hz to 200 Hz, or at least from 15 to 800 Hz.

The operative frequency range may be contained in a range from 15 Hz to 200 Hz.

The control unit and/or control process may be configured to control the actuator(s) to provide said at least one burst of primary vibration, wherein said burst has a burst duration, and to provide a train of several successive bursts of primary vibration, until the expiration of a burst train duration.

- The shear wave may be generated and/or may propagate at or up to a depth of at least 15 millimeters inside the body of the subject.
- The shear wave may have an amplitude of at least 10 micrometers at or up to a depth of at least 15 millimeters inside the body of the subject.
- The control unit and/or control process may be configured to turn on or off the actuator(s) based on the status of a manually activated switch.
- The control unit and/or control process may be configured to turn on or off the actuator(s) based on the measurement of at least one physiological parameter of a subject.
- The device may comprise a monitor configured to measure at least one physiological parameter of the subject.
- The device may comprise a wired communication link configured to link the device with a monitor configured to measure the at least one physiological parameter of the subject, and/or a wireless communication link configured to receive the at least one physiological parameter of the subject from a remote monitor.
- The monitor may be selected from a medical monitor, a life style monitor, or a phone.

The invention further relates to a method of treating a subject in need thereof, said method comprising providing at least one burst of at least one primary vibration to the subject by external contact of at least one actuator with the subject, in order to generate a shear wave in the subject and to induce a physiological change in the subject in response to the shear wave.

BRIEF DESCRIPTION OF THE DRAWINGS

These and/or other aspects will become apparent and more readily appreciated from the following description of the embodiments, taken in conjunction with the accompanying drawings of which:

FIG. 5A illustrates, as an example, a straightforward cosine function.

DETAILED DESCRIPTION

Figure 1:
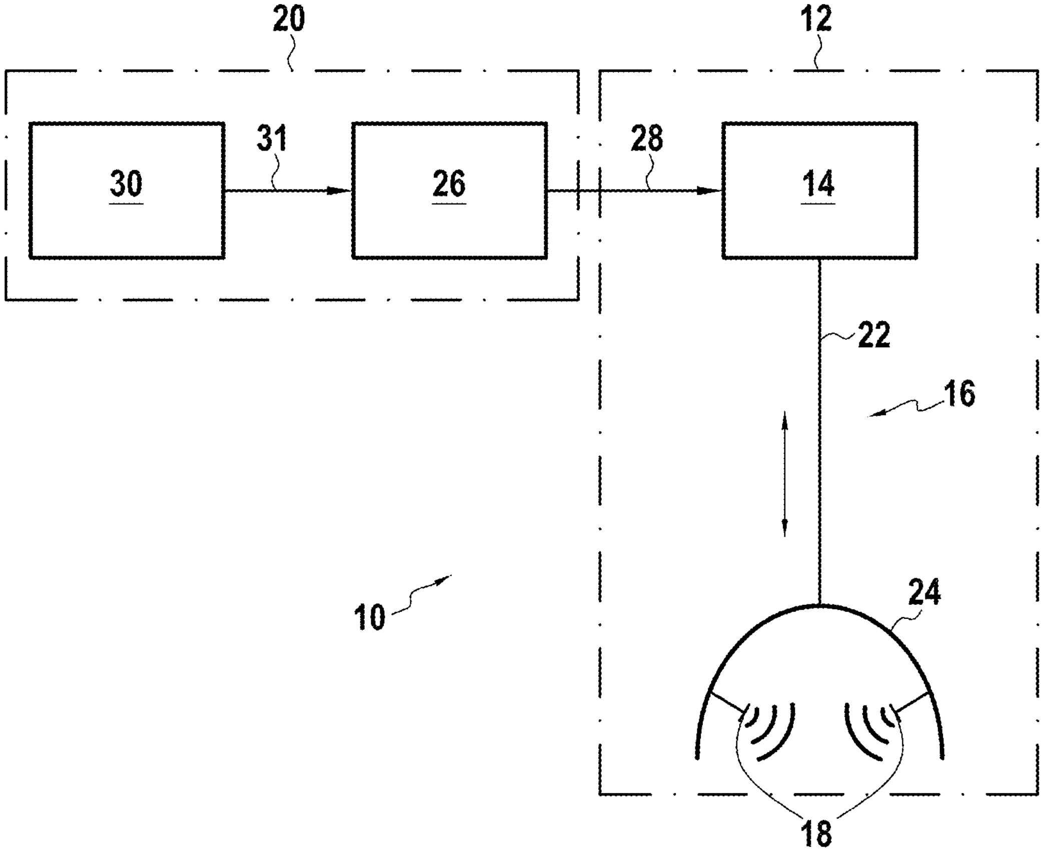
FIG. 1 is a diagram illustrating a configuration of an exemplary device according to some embodiments of the present teachings.

Terms used in the disclosure have been selected as general terms which are used by those of ordinary skill in the art, in consideration of the functions of the present teachings, but may be altered according to the intent of a person ordinarily skilled in the art, conventional practice, or introduction of new technology. Also, if there is a term which is arbitrarily selected in a specific case, the meaning of the term will be described in detail in a corresponding description portion of the present teachings. Therefore, the terms should be defined or understood on the basis of the entire content of the disclosure, instead of a simple name of each of the terms.

In the present teachings, when it is described that one includes (or comprises or has) some elements, it should be understood that it may include (or comprise or has) only those elements, or it may include (or comprise or have) other elements as well as those elements if there is no specific limitation.

The term "about," as used herein, generally refers to within 10%, 5%, 1%, or 0.5% of a given value or range. Alternatively, the term "about" means within an acceptable standard error of the mean when considered by one of ordinary skill in the art. In the present teachings, each numerical parameter should be construed in light of the number of reported significant digits and by applying ordinary rounding techniques.

The term "subject" refers to a living human or animal, including all mammals such as primates (particularly higher primates), sheep, dog, rodents (e.g., mouse or rat), guinea pig, goat, pig, cat, rabbit, and cow.

As used herein, the terms "treating," "treatment," "ameliorating," and "encouraging" may be used interchangeably herein. These terms refer to an approach for obtaining beneficial or desired results including, but not limited to, therapeutic benefit and/or prophylactic benefit. By therapeutic benefit it is meant eradication or amelioration of the underlying disorder being treated. Also, a therapeutic benefit is achieved with the eradication or amelioration of one or more of the physiological symptoms associated with the underlying disorder such that an improvement is observed in the subject, notwithstanding that the subject can still be afflicted with the underlying disorder. For prophylactic benefit, the device may be used or the process may be applied to a subject at risk of developing a particular disease, or to a subject reporting one or more of the physiological symptoms of a disease, even though a diagnosis of this disease may not have been made.

The term "breathing-related sleep disorder" refers to a spectrum of breathing anomalies, which can include (benign) snoring, habitual snoring, chronic snoring, upper airway resistance syndrome (UARS), obstructive sleep apnea (OSA), and obesity hypoventilation syndrome (OHS). In some embodiments, it includes chronic snoring. In some embodiments, it includes habitual snoring. In some embodiments, it includes upper airway resistance syndrome (UARS). In some embodiments, it includes obstructive sleep apnea (OSA). In some embodiments, it includes obesity hypoventilation syndrome (OHS).

In subjects with UARS, the sleep quality can be generally disrupted to the point of causing clinical consequences such as difficulty initiating or maintaining sleep (insomnia), nonrefreshing sleep, or excessive daytime sleepiness. Because of the very brief nature of the many arousals triggered by snoring, subjects with UARS may not be aware of these awakenings or may not know that they may be snoring if it were not for the witnessed reports from a bed partner or family member.

OSA can be characterized by repetitive episodes of shallow or paused breathing (sometimes referred to as "apneas") during sleep. In some embodiments, the repetitive episodes occur despite the subject's effort to breathe. In some embodiments, OSA is associated with a reduction in blood oxygen saturation. In some embodiments, the apneas last at least 10 seconds. In some embodiments, the apneas last between 10 and 90 seconds. In some embodiments, the apneas last less than 20 seconds. In some embodiments, the apneas last more than 40 seconds. In some embodiments, the apneas last between 10 and 15 seconds, between 15 and 20 seconds between 20 and 25 seconds, between 25 and 30 seconds, between 30 and 35 seconds, between 35 and 40 seconds, between 40 and 45 seconds, between 45 and 50 seconds, between 50 and 55 seconds, between 55 and 60 seconds, between 60 and 65 seconds, between 65 and 70 seconds, between 70 and 75 seconds, between 75 and 80 seconds, between 80 and 85 seconds, or between 85 and 90 seconds.

The terms "blood oxygen saturation," "blood oxygen level," "blood oxygen saturation level," or "$SO_2$" refer to the fraction of oxygen-saturated hemoglobin relative to total hemoglobin (unsaturated+saturated) in the blood. The blood oxygen saturation can be measured in various tissues by using various methods. In some embodiments, the blood oxygen saturation includes arterial oxygen saturation or $SaO_2$. In some embodiments, the blood oxygen saturation includes venous oxygen saturation or $SvO_2$. In some embodiments, the blood oxygen saturation includes tissue oxygen saturation or $StO_2$. In some embodiments, the blood oxygen saturation includes peripheral oxygen saturation or $SpO_2$. In some embodiments, the blood oxygen saturation is measured by an arterial blood gas test. In some embodiments, the blood oxygen saturation is measured by using near infrared spectroscopy. In some embodiments, the blood oxygen saturation is measured by a pulse oximeter device.

In some embodiments, the normal blood oxygen pulse saturation is 95% or above. In some embodiments, the normal blood oxygen pulse saturation is about 98% or above. In some embodiments, the normal blood oxygen saturation is about 99% or above.

The term "respiratory air flow rate" is the volume of air inspired by the lungs per unit of time, and the measurement of which may be used for diagnostic purposes. The respiratory air flow rate may be measured through a facial mask covering the mouth and nose of the subject. When the respiratory air flow rate is expressed with a negative figure, it indicates a volume of air exhales by the lungs per unit of time.

In some embodiments, a subject having a hypoxemia sleep disorder has a reduced blood oxygen saturation. In some embodiments, the reduced blood oxygen pulse saturation is about 92% or below. In some embodiments, the reduced blood oxygen pulse saturation is about 90% or below. In some embodiments, the reduced blood oxygen pulse saturation is about 88% or below. In some embodiments, the reduced blood oxygen pulse saturation is about 86% or below. In some embodiments, the reduced blood oxygen pulse saturation is about 84% or below. In some embodiments, the reduced blood oxygen pulse saturation is about 82% or below. In some embodiments, the reduced blood oxygen pulse saturation is about 80% or below. In some embodiments, the reduced blood oxygen pulse saturation is about 78% or below. In some embodiments, the reduced blood oxygen pulse saturation is about 75% or below. In some embodiments, the reduced blood oxygen pulse saturation is about 70% or below. In some embodiments, the reduced blood oxygen pulse saturation is about 65% or below. In some embodiments, the reduced blood oxygen pulse saturation is about 95%, about 94%, about 92%, about 90%, about 88%, about 86%, about 84%, about 83%, about 80%, about 78%, about 76%, about 74%, about 72%, about 70%, about 68%, about 65%, about 63%, or about 60%.

In some embodiments, a subject with a sleep disorder has a reduction of the maximum respiratory air flow rate over a predetermined amount of time, compared to a reference air flow rate for the same subject. In some embodiments, the reduced air flow rate is about 50% or below. In some embodiments, the reduced air flow rate is about 45% or below. In some embodiments, the reduced air flow rate is about 40% or below. In some embodiments, the reduced air flow rate is about 35% or below. In some embodiments, the reduced air flow rate is about 30% or below. In some embodiments, the reduced air flow rate is about 25% or below. In some embodiments, the reduced air flow rate is about 20% or below. In some embodiments, the reduced air flow rate is about 15% or below. In some embodiments, the reduced air flow rate is about 10% or below. In some embodiments, the reduced air flow rate is about 5% or below.

The term "actuator", as used herein, refers to a device that has an output member, for example in the form of a contact pad, to which the actuator imparts a movement, here a vibration. In some embodiments, the device is an electromechanical or electromagnetic device. In some embodiments, the device is a piezoelectric device. In some embodiments, the device is a hydraulic device. In some embodiments, the device is a pneumatic device. In some embodiments, the device is a thermal device.

The term "vibration" as used herein, generally refers to a mechanical phenomenon whereby oscillations of one or several points of a body or medium occur about an equilibrium point. The oscillations may be periodic or random. In some embodiments, the vibration is provided by an actuator of the present teachings. A vibration which is provided by an actuator to the body of a subject, typically the vibration occurring at a contact pad of the actuator, is called a primary vibration.

In some embodiments, the primary vibration generates, inside the body of the subject, a mechanical shear wave. Without limiting the scope of the present teachings by any particular theory or hypothesis, when a mechanical energy propagates through a medium, it can have two main modes, in one of which, the medium particles oscillate in a direction perpendicular to the wave propagation direction. In some embodiments, this mode of propagation is called "shear wave".

Device

In one aspect, the present teachings relate to medical devices for treating a subject. In some embodiments, the subject may be suffering from a respiratory condition. In some embodiments, the device includes one or more actuators, each of which is defined herein. For example, the one or more actuators can be arranged conveniently in a form that fits the anatomical shape of a subject. In some embodiments, the one or more actuators are arranged around a body part, hereinafter called external anatomical site. In some embodiments, the one or more actuators are arranged around the neck region of a subject. In some embodiments, at least one actuator of the present teachings is arranged at the neck of a subject. In some embodiments, the one or more actuators is/are affixed to a holder, preferably a flexible holder, for example in the form of a neck belt. In some embodiments, the one or more actuators are arranged around the chest of a subject. For example, the one or more actuators can be arranged around the upper chest of a subject. In some embodiments, at least one actuator of the present teachings is arranged at the chest of a subject. In some embodiments, the one or more actuators is/are affixed to a holder, preferably a flexible holder, for example in the form of a chest belt. In some embodiments, the one or more actuators are provided in the form of a vest.

In some embodiments, the device comprises several actuators which vibrate asynchronously. In some embodiments, the device comprises several actuators which vibrate synchronously. In some embodiments, the several actuators vibrate at multiple different frequencies. In some embodiments, the one or more actuators vibrate at one frequency.

In some embodiments, the device includes one or several monitors or the device may be configured to operate together with one or several monitors, for example through a wired or a wireless (Wi-Fi®, Bluetooth®, . . . ) communication link configured to link the device with the monitor. The monitor or monitors may be configured to measure at least one physiological parameter of the subject. For example, a monitor can be or can comprise a blood oxygen monitor, a carbon dioxide monitor, a respiratory air flow rate monitor, a respiratory rate monitor, a heart rate monitor, a body movement monitor, an electrocardiographic (ECG) monitor, an electroencephalographic (EEG) monitor, electromyography (EMG) monitor, and/or also a Sleep Stage study monitor.

In some embodiments, the monitor includes a blood oxygen saturation monitor. In some embodiments, the device includes a $SaO_2$ monitor. In some embodiments, the monitor includes a $SvO_2$ monitor. In some embodiments, the monitor includes a $StO_2$ monitor. In some embodiments, the monitor includes a $SpO_2$ monitor. In some embodiments, the monitor includes a pulse oximeter.

In some embodiments, the monitor includes a blood $CO_2$ monitor. In some embodiments, the monitor includes an oronasal thermal airflow rate monitor. In some embodiments, the monitor includes a thermal flow sensor. In some embodiments, the monitor includes a nasal pressure sensor. In some embodiments, the monitor includes a blood pressure sensor. In some embodiments, the monitor includes a heart-rate monitor. In some embodiments, the monitor includes a respiratory rate monitor. In some embodiments, the monitor includes a body position sensor. In some embodiments, the monitor includes a snore sensor.

In some embodiments, the monitor is configured to monitor vibrations. In some embodiments, the vibrations come from the internal regions of the body. For example, the vibrations can be produced by snoring.

In some embodiments, the device includes a control unit. For example, the control unit can receive an input from a manually activated switch to automatically turn on or/and off one actuator of the device or several actuators of the device, or/and can be configured to automatically turn on or/and off one actuator of the device or several actuators of the device, for example based on a measurement received of a monitor. Indeed, in some embodiments, the device includes a control unit configured to receive a measurement from a monitor of the present teachings. In some embodiments, the device includes a control unit configured to provide a reference measurement. In some embodiments, the device includes a control unit configured to compare the measurement with the reference measurement. In some embodiments, the device includes a manually activated switch configured to turn on or off an actuator.

Thus, in some embodiments, a device of the present teachings comprises at least a first actuator, and a control unit, and wherein the control unit is configured to control the first actuator by turning on the first actuator to provide at least one burst of a first primary vibration, such that the device provides to the subject a primary vibration comprising a first primary vibration, and by turning off the first actuator.

On FIG. 1 are shown some elements of an example of a device for treating a subject according to the present teachings. More precisely, FIG. 1 shows a device 10 comprising an actuator 12, in this case a single actuator. The actuator 12 comprises a vibrator 14, capable of generating a vibratory movement, and an applicator 16 having one or several contact pads 18 which are configured for external mechanical contact with a subject.

In this example and also in the following examples, a contact pad 18 may comprise interface material intended for direct contact to the subject, typically for direct contact with the body of the subject, typically for direct contact with the skin of the subject.

As discussed above, the vibrator 14 is a source of mechanical vibratory movement which can be controlled by a control unit 20. The vibrator 14 can comprise a motor, for example an electric motor. The motor can be for example a linear motor or rotary motor, providing a raw movement which may be vibratory, for example with a linear motor, or which may be continuous, for example with a rotary motor. The vibrator 14 can comprise a mechanical transmission which may convert the raw movement into a vibratory movement. The mechanical transmission can include a crack/rod mechanism or a cam mechanism, or can include an out-of-center weight for converting a continuous rotary raw movement into an alternating linear vibratory movement. However, in one embodiment, the vibrator can comprise an electromagnetic shaker such as SmartShaker™ Model K2004E01 with integrated power amplifier, available from The Modal Shop, Inc. 3149 E Kemper Road, Cincinnati, Ohio 45241, USA. Such electrodynamic exciter is a small, portable permanent magnet shaker with a power amplifier integrated in its base. In this example, the applicator 16 transmits the vibratory movement generated by the vibrator 14 to the contact pads 18. The applicator 16 may comprise a frame, for example a rigid frame, which here comprises a main rod 22, which is here rectilinear. In the example, the main rod 22 has one end mechanically connected to the vibrator 14 and its other end is mechanically connected to a bracket 24 carrying the one or several contact pads 18.

In the shown example, the bracket 24 is configured to match the contour of an external anatomical site of the subject. In the shown example, the bracket 24 is arcuate in shape in order to match the contour of the neck of a subject. In this example, the vibrator 14 delivers a linear vibratory movement to the main rod 22 wherein the axis of the linear vibratory movement is aligned with the axis of the rectilinear main rod 22. The arcuate bracket 24 extends for example in a plane containing the axis of the rectilinear main rod 22. The arcuate bracket 24 is for example in the shape of a half circle. While only two contact pads 18 are represented, the arcuate bracket may comprise more contact pads, for example 3, 4, 5, 6, 7, 8 or more contact pads. These contact pads may be spread over the extension of the bracket 24, either with regular spacing or with irregular spacing. Such spacing may be random. The contact pads can be spread along one dimension, for example spread over an arc, or along two dimensions of the bracket, for example spread over several parallel arcs or randomly distributed on the 2D or 3D surface of the bracket.

In some embodiments, all the contact pads of a given actuator, in this example carried by the arcuate bracket 24, can be considered to have the same vibratory movement which is imparted to the applicator 16 by the vibrator 14. In such case, the applicator 16 is considered to be rigid. However, in some embodiments, the applicator 16 may exhibit some flexibility, while still being able to convey a vibratory movement from the vibrator to the contact pads. For example, such flexibility may allow some adaptation of the shape of the applicator to the actual subject. In such a case, the vibratory movements of different contact pads located at different locations on the applicator may be different, typically having a different amplitude and/or direction and/or different phase. For example, in the configuration of FIG. 1, the main rod 22 may be considered rigid, i.e. with no significant difference of movement between one end and the other end of the main rod 22, while the bracket 24 may exhibit some flexibility.

In the shown example, the contact pads 18 each have a different orientation depending on the location of the contact pad on the bracket 24. However, in a variant, several contact pads, or even all contact pads of the actuator, may be parallel one to the other. Each contact pad may be designed and configured to have a contact surface parallel to the body of the subject at the contact location between the contact pad 18 and the body of the subject. However, one or several or all of the contact pads may have a rounded contact surface. Understandably, the contact pads are thus able to deliver to the subject, by external mechanical contact of its contact surface with the skin of the subject, a primary vibration.

Figure 2:
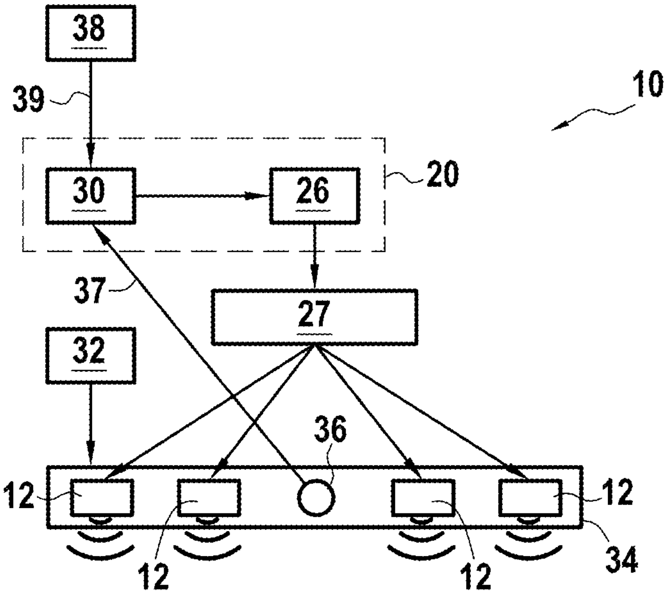
FIG. 2 is a diagram illustrating a configuration of another exemplary device according to some embodiments of the present teachings.
Figure 3:
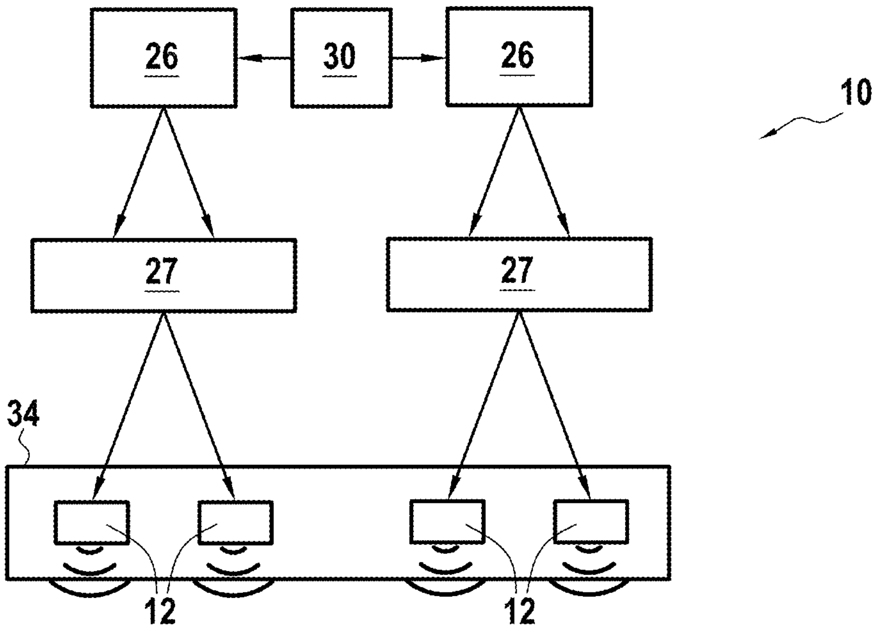
FIG. 3 is a is a diagram illustrating a configuration of another exemplary device according to some embodiments of the present teachings.

In some embodiments, such as shown in the examples of FIG. 2 and FIG. 3, the contact pad 18 of the actuator is an external surface of the vibrator 14, typically when the vibrator is a piezoelectric vibrator.

The control unit 20 is configured to control the actuator 12 in such a way that the actuator provides to the subject a primary vibration. The control unit 20 can thus be configured to control the vibrator 14. The control unit 20 may comprise a control signal generator, for example in the form of a controllable electric generator 26, configured to deliver a control signal 28 to the vibrator 14. The control signal 28 is typically an electric control signal. The control unit 20 may comprise an electronic control circuit 30, typically comprising a processor, one or several electronic memories, one or several communication circuits having one or several input and/or export ports, etc. . . . , for controlling the control signal generator 26. In any case, a link 31, such as a communication link and/or an electrical link, may be provided between an electronic control circuit 30 and a control signal generator 26. In some embodiments, the control unit 20 may be stacked with an actuator 12, for example stacked with the vibrator 14. In some embodiments, it can be provided that part of the control unit 20, for example a control signal generator 26, may be stacked with the actuator, for example stacked with the vibrator 14, while another part of the control unit, for example the electronic control circuit(s) 30, may be remote from the holder. In some embodiments, the control unit 20 is remote from the actuator 12.

Depending on the type of vibrator 14, the control signal 28 may be an image of the primary vibration delivered by the actuator 12 to the subject.

A device according to the present teachings may comprise a single actuator. However, it also may comprise several actuators, including for example at least a first actuator and at least a second actuator, as in the examples of FIG. 2 and of FIG. 3. In a device comprising several actuators, the actuators may be identical or may be of different types. In the examples of FIG. 2 and of FIG. 3, the device comprises four identical actuators, preferably of the electromechanical type, most preferably piezoelectric.

As in the example of FIG. 2, a device according to the present teachings may have all its actuators controlled with the same control signal 28 which may be delivered by the same control signal generator 26. On the other hand, as in the example of FIG. 3, a device according to the present teachings may have several actuators which are controlled with different control signals 28 which may be delivered by different control signal generators 26, as illustrated, or by different outputs of the same control signal generator.

As illustrated in FIGS. 2 and 3, in a device according to the present teachings, a control signal amplifier 27 may be provided between the control signal generator 26 and the one or several vibrators. Such a control signal amplifier 27 may be part of the control unit 20 or may be part of the actuator or may be a separate entity in between. In the exemplary embodiment of FIG. 2, one single control signal amplifier 27 is used for all the actuators 12, while in the exemplary embodiment of FIG. 3, there are several control signal amplifiers 27 each delivering a control signal 28 to one or to a subset of the actuators 12 of the device. In the case of several control signal generators, the control unit may comprise one single electronic control circuit 30 driving all the control signal generators 26, or may comprise several electronic control circuits 30, each driving one or several control signal generators, but considered as forming part of a same control unit.

In both examples, one may use any type of actuator, including any type of vibrator. However, compact actuators are desirable. The actuators may comprise a piezoelectric vibrator 14, which can be considered as a type of linear motor which, fed with an alternating electric control signal 28, delivers a linear vibratory raw movement. As an example, one may implement, as actuators 12, actuators of the APA series from CEDRAT TECHNOLOGIES, 59 Chemin du Vieux Chêne, Inovallée, 38246 MEYLAN Cedex, France. Each of such actuators is a mechanical magnified preloaded stack of low voltage piezoelectric ceramics. For example, APA600MML actuators may be used.

Typically, a device according to the present teachings may comprise or be connected with an energy source 32 for the operation of the actuators, and for the operation of the control unit. In the case of an electromechanical or electromagnetic vibrator, the energy source can be an electrical source which can comprise any one of the domestic electric network, of an electric converter or transformer, which may be connected to the domestic electric network, of a battery, etc. The energy source may be dedicated to the device.

The device according to the present teachings may comprise one or several monitors as discussed above for measuring at least one physiological parameter of the subject. In the example of FIG. 2, is shown in one monitor 36 which is linked to the control unit 20 through a communication link 37 which is for example a wired link, such as an electric cable. In the same example, another monitor 38 is linked to the control unit through another communication link 39 which is for example a wireless link, such as a Bluetooth® communication link. The communication link allows the control unit 20 to receive from the monitor the measured physiological parameter. The communication link may interface with the electronic control circuit 30 of the control unit 20.

In a device according to the present teachings, the one or several actuators may be arranged on a holder 34. Such a holder 34 may be configured to permit or facilitate the attachment of the actuator or actuators to the subject. For example, without limitation, the holder may be in the form of a neck belt, of a thoracic belt, of a vest, of a diaphragmatic belt, or of an abdominal belt. Preferably, the holder, especially if it holds several actuators, conforms to a body region of the subject to which the actuators are to be applied. Typically, the holder may be flexible, for example comprising a fabric structure and/or a flexible polymer structure, and/or may, at least in part, be semi-rigid, i.e. elastic, and/or may be articulated. The actuators may be spread over the extension of the holder, either with regular spacing or with irregular spacing. They can be spread along one dimension, for example spread over a line, or along two dimensions or three dimensions of the holder. It is to be noted the control unit 20, or at least part of it, can also be arranged on the holder. In some embodiments, it can be provided that part of the control unit 20, for example the control signal generator(s), may be arranged on the holder 34 while another part of the control unit, for example the electronic control circuit(s) may be remote from the holder 34.

In some embodiments, such as illustrated in the examples of FIG. 2 and FIG. 3, one or several actuators 12 may be wholly or partially encapsulated in the holder. In such a case, the holder may comprise a liner which covers the contact pad 18. In such a case, the liner is preferably configured so as to provide as little attenuation as possible to the vibratory movement of the contact pad 18, so that the latter can still be considered to be in external mechanical contact with the subject, even though this external mechanical contact may be indirect through the liner rather than direct in the absence of any liner.

Figure 4:
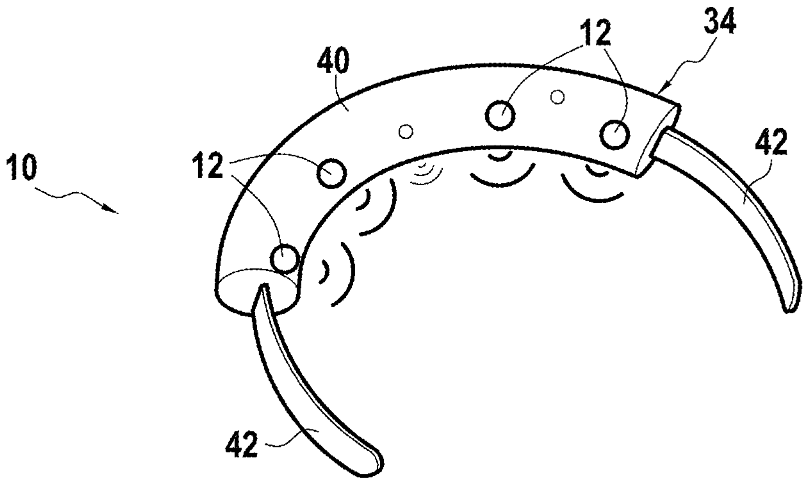
FIG. 4 is a schematic illustration of a device according to FIG. 2 or FIG. 3.

FIG. 4 is a schematic illustration of an embodiment of a device which may be according to the diagrams of FIG. 2 or FIG. 3. In this example, the several actuators 12 are arranged on a holder 34 in the form of a belt, for example a neck belt. The holder 34 exhibits a central casing 40 accommodating the actuators 12. The central casing 40 may have an elongated shape to follow at least part of the contour of the neck of the subject, for example to match the front part of the neck of the subject. The central casing 40 may be flexible or rigid or a state in between rigid and flexible. The holder 34 may also comprise one or several lateral wings 42, which may be of arcuate shape, extending on both sides of the elongated arcuate central casing 40 so that the holder may attach around the neck of the user by circumventing more than half of the circumference of the neck. In this example, the holder 34 is in the shape of an arc which extends over less than a full circle and is therefore open between the free ends of the lateral wings 42.

In devices comprising several actuators, i.e. at least one first actuator and at least one second actuator, where both are configured for external mechanical contact with the subject, the control unit may be configured to control the first actuator to provide at least one burst of a first primary vibration, and to control the second actuator to provide at least one burst of a second primary vibration. In such a case, the device as a whole provides, via its several actuators, a primary vibration, or global device primary vibration, which comprises the primary vibrations provided by each of the actuators of the device, including the first primary vibration and the second primary vibration. The control unit may thus be configured to turn on or off the first actuator and also to turn on or off the second actuator. In some embodiments, the first and second primary vibrations may be synchronous. They may in fact result from the same control signal 28 being provided to both the first and second actuators, in which case they will have the same amplitude and same frequency content. However, they may exhibit different amplitudes. In other embodiments, the first and second primary vibrations may exhibit a phase shift. They may result in a so-called focusing of the vibrations as they propagate inside the body of the subject. Of course, the same principle may be applied with more than two actuators. In such a case, all actuators of the device may be controlled to provide synchronous primary vibrations, or different subsets of actuators of the device can be controlled to provide primary vibrations which are synchronous within a given subset but exhibiting a phase shift between different subsets, where a subset of actuators comprises one or several actuators.

Primary Vibrations

In the present teachings, the primary vibration provided by an actuator in a device according to the present teachings, or in a control process for a device, or implemented in the use of such device or in a treatment method according to the present teachings is the vibratory movement which is delivered at the surface of contact of the actuator with the subject, i.e. the contact pad(s) 18 in the examples above. The primary vibration is provided as a burst during a burst duration which starts at the turning on of the actuator and stops at the turning off of the actuator. During a given treatment, the device may be configured to deliver a train of several successive bursts of primary vibration, until the expiration of a burst train duration. In such a train of bursts, two successive bursts may be directly continuous or may be separated by a lapse duration during which the actuator is turned off. Different bursts provided by the same actuator can correspond to the same control signal resulting in the same primary vibration having the same frequency content, amplitude etc. In some embodiments, a burst train is the succession of bursts which are repeated at a burst repeat frequency. However, different bursts provided by the same actuator can correspond to different control signals resulting in different primary vibrations during the different bursts.

In some embodiments, the primary vibration provided by an actuator 12 of the device is a periodic vibration which has a single constant primary frequency during a given burst. Preferably, the single constant primary frequency is contained in an operative frequency range which is itself contained in a range from 5 Hz to 1000 Hz.

The operative frequency range is a range of frequencies within which at least one primary frequency should be chosen to be operative in view of creating a shear wave inside the subject and for the treatment to be operative. The operative frequency range is believed to be comprised at most in the range of 5 to 1000 HZ. However, especially for some treatments on some subjects, the operative frequency range is believed to be comprised at most in the range of 15 to 200 HZ.

Figure 5A:
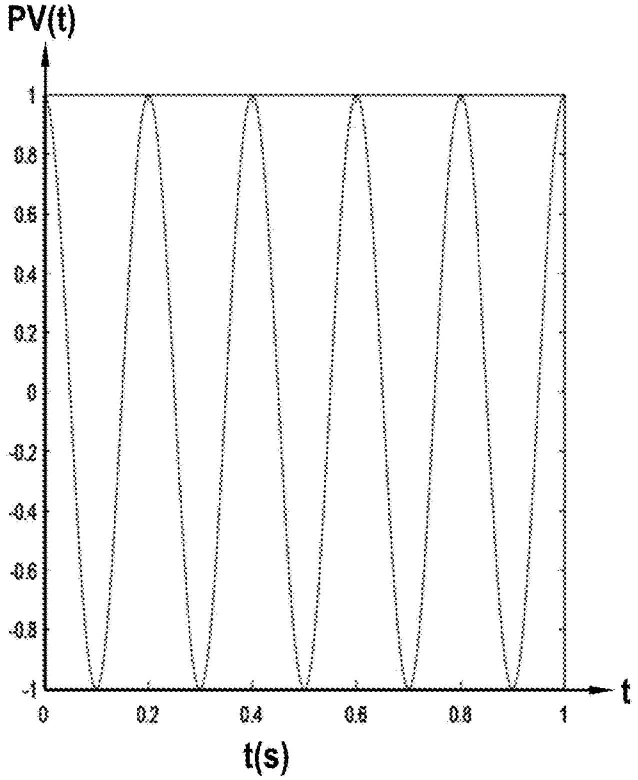
FIG. 5A is a graph showing an example of a primary vibration, represented by its amplitude PV(t) versus time (t) during a burst, according to some embodiments of the present teachings.

An example of such a primary vibration is illustrated in FIG. 5A, where the primary vibration is in the form of a cosine wave whose value along time during a burst duration can be written as a the following time function:

$$PV(t)=A*\cos[?](2*n*f*t+\varphi))$$

with

A: vibration amplitude;

f: vibration frequency;

t: time;

φ: vibration phase.

Figure 5B:
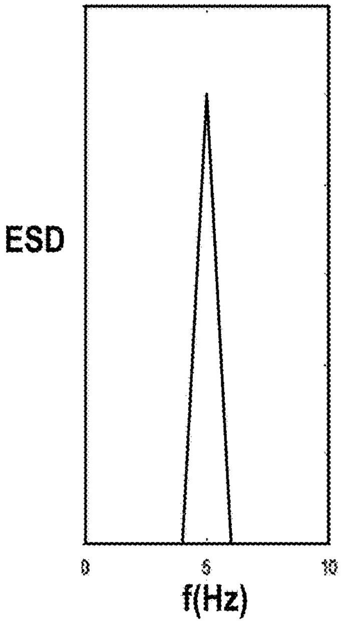
FIG. 5B illustrates the normalized energy spectral density (ESD) of the primary vibration of FIG. 5A, expressed as the square of the FFT in the frequency domain (f) of the primary vibration of FIG. 5A.
Figure 5C:
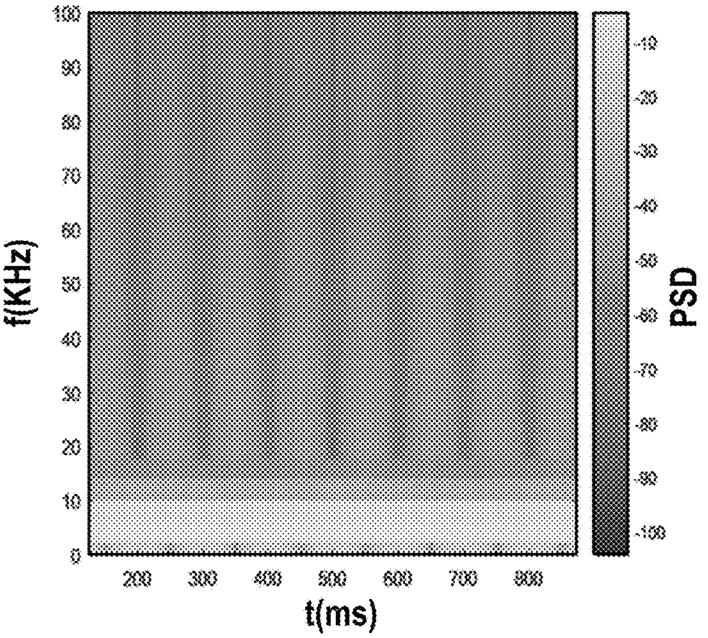
FIG. 5C illustrates the power spectral density of the primary vibration of FIG. 5A, in the time domain, according to some embodiments of the present teachings.

In the example of FIG. 5A, the frequency of the primary vibration is of 5 Hz. It is to be noted that while FIG. 5A illustrates the vibration over a duration of 1 second, this could be the duration of a burst or a burst could last longer. FIG. 5B illustrates the normalized squared Fast Fourier Transform of the primary vibration, expressed in the frequency domain, where normalized means the calculated values have been divided by the maximum calculated value over the frequency content. This function represents the ratio of the energy for each frequency comprised in the vibration, over the duration of a given burst. As, in this example, there is a single primary frequency, very evidently all of the energy of the vibration occurs at the single primary frequency which, in this example is of 5 Hz. FIG. 5C represents the time-frequency power spectral density over one burst with, along the X-axis, the time expressed in seconds, along the Y-axis the frequency expressed in kilohertz, and where each point of the graph has a level of gray which is proportional to the power of the vibration at the given point in time read on the X-axis and for the given frequency of that point read on the Y-Axis. In the grayscale, black represents no power for the given frequency and given time point and white represents maximum power. It is thus here clear that during the length of a burst, power remains constant and concentrated at the single primary frequency.

In order for the device to be operative for the intended treatment, it has been found that the device should preferably be configured to generate, inside the body of the subject, a shear wave, propagating into the body to reach certain body tissues which are at a certain depth under the skin and which are operative in the disorder to be treated. Therefore, it has been found desirable that the shear wave induced by the operation of the device is generated and/or propagates at or up to a depth of at least 10 millimeters, preferably at least 15 millimeters inside the body of the subject. In some embodiments, the shear wave induced by the operation of the device is generated and/or propagates at or up to a depth of at least 30 millimeters, preferably at least 50 millimeters inside the body of the subject. In the experiments, it has been shown that the shear wave induced by the operation of the device propagates up to a depth of at least 30 millimeters inside the body of the subject.

To that effect, it is known from applicant's tests that the primary vibration(s) generated by the actuator(s) of the device should preferably be of the type having at least one primary frequency contained in a range from 5 Hz to 1000 Hz.

The frequency spectrum delivered by the device during a treatment method, for an effective treatment, does not necessarily need to span the entire operative frequency range. To the contrary, as will be discussed below, the frequency spectrum delivered by the device during a treatment method may comprise a single primary frequency, or a number of primary frequencies, and/or a delivered frequency range which does not comprise all of the operative frequency range. The frequency spectrum delivered by the device during a treatment method may correspond to a fraction only of the operative frequency range.

It is useful to note that the primary vibration, which occurs at the contact pad of the actuator(s) of the device, at the external contact with the body of the subject, does not necessarily need to be a shear vibration with respect to the surface of the body on which the primary vibration is applied. Indeed, while it is possible to contemplate a configuration of the device where the contact pads would have a primary vibration alternating in a direction parallel to the surface of the body, i.e. in most cases parallel to the skin, such a condition is not necessary. It has indeed been shown that a primary vibration consisting in an alternating vibration along the direction perpendicular to the surface of the body, i.e. a compressive vibration with respect to the surface of the body to which it is applied, may generate a shear wave inside the body, such a shear wave propagating at a certain depth. It has in fact been shown that multiple shear waves may be generated in that way, each having different propagation directions inside the body. The primary vibration can be or can include a rotary movement, preferably an alternating rotary movement for example around an axis perpendicular to the surface of the body on which it is applied. The primary vibration can be or can include an alternating movement along one single dimension, along two dimensions, i.e. along a surface, or along three dimensions, i.e. in a volume. The primary vibration can be or can include an alternating movement along at least one dimension parallel to the surface of the body of the subject at the location where it is applied. The primary vibration can be or can include an alternating movement along at least one dimension perpendicular to the surface of the body of the subject at the location where it is applied.

It has been shown that shear waves having a frequency over a frequency of 1000 Hz are strongly dissipated in body tissues and therefore do not propagate well towards the depth of the body, thereby being unable to reach the desired operative tissues with sufficient energy to affect the disorder to be treated.

While primary frequencies of up to 1000 Hz are contemplated, for example up to 800 Hz for certain subjects, it has also been found that, especially for some applications, the primary frequency is preferably contained in a range from 15 Hz to 200 Hz. Indeed, it has been determined that, below 15 Hz, any shear wave which may be generated does not have enough power. Also, maintaining the primary frequency below 200 Hz enhances the propagation of the shear wave inside the body, including up to a depth allowing it to reach tissues or organs which are not superficially located.

In some embodiments, the primary vibration includes a primary frequency of about 15 Hz, about 20 Hz, about 25 HZ, about 30 Hz, about 35 Hz, about 40 Hz, about 45 Hz, about 50 Hz, about 55 Hz, about 60 Hz, about 65 Hz, about 70 Hz, about 75 Hz, about 80 Hz, about 85 Hz, about 90 Hz, about 95 Hz, about 100 Hz, about 105 Hz, about 110 Hz, about 115 Hz, about 120 Hz, about 125 Hz, about 130 Hz, about 135 Hz, or about 140 Hz. In some embodiments, the primary vibration includes a primary frequency of about 70 Hz, about 75 Hz, about 80 Hz, about 85 Hz, about 90 Hz, about 95 Hz, about 100 Hz, about 105 Hz, about 110 Hz, about 115 Hz, about 120 Hz, about 125 Hz, about 130 Hz, about 135 Hz, or about 140 Hz. In some embodiments, the primary vibration includes a primary frequency of about 90 Hz, about 95 Hz, about 100 Hz, about 105 Hz, about 110 Hz, about 115 Hz, about 120 Hz, about 125 Hz, about 130 Hz, about 135 Hz, or about 140 Hz. In some embodiments, the primary vibration includes a first frequency of about 90 Hz. In some embodiments, the primary vibration wave includes a primary frequency of about 95 Hz. In some embodiments, the primary vibration includes a primary frequency of about 100 Hz. In some embodiments, the primary vibration includes a primary frequency of about 105 Hz. In some embodiments, the primary vibration includes a primary frequency of about 110 Hz. In some embodiments, the primary vibration includes a primary frequency of about 115 Hz. In some embodiments, the primary vibration includes a primary frequency of about 120 Hz. In some embodiments, the primary vibration includes a primary frequency of about 125 Hz.

However, tests have shown that experimental applications proved to be sensitive to the choice of the primary frequency of the primary vibration(s). Preliminary understanding is that primary frequencies which are most effective for obtaining the desired treatment could vary from subject to subject, in addition to probably also depending on other factors such as the disorder which is to be treated, the body tissues which are involved in the disorder, etc.

Therefore, rather than using a device providing primary vibration(s) at a single primary frequency, the applicants have designed a device which provides, to the body of the subject, a primary vibration having a frequency content, or frequency spectrum, spanning a delivered frequency band contained in, or overlapping, an operative frequency range contained in a range from 5 Hz to 1000 Hz. Examples of such primary vibrations are given in reference to FIGS. 6A to 13C.

As will be understood from the examples below, the frequency content of a given primary vibration, whether it is a primary vibration delivered by a given actuator, or the global device primary vibration delivered globally by several actuators of the device, may be derived by performing a Fast Fourier Transform on the time function of the primary vibration over the duration of a burst. Such a Fast Fourier Transform will allow to identify, within any primary vibration, one or several primary frequencies, and/or primary delivered frequency bands, which have a significant amplitude, and/or energy and/or power, to generate, inside the body, a shear wave having the desired the treatment effect. As will be understood from the examples below, the frequency content of a given primary vibration may contain frequencies which are non-operative, either because they are out of the range of 5 Hz to 1000 Hz, or out of the range of 15 Hz to 200 Hz, or because they have an amplitude and/or energy and/or power insufficient to generate, inside the body, a shear wave having the desired treatment effect. Typically, operational frequencies would be considered to generate shear waves having an amplitude, at the targeted tissue location, equal or higher than the amplitude of the wave generated by spontaneous snoring of the subject.

In the present teachings, in the context of a primary vibration having a frequency content spanning a delivered frequency band, the delivered frequency band is defined as a range of frequencies having an upper limit frequency and a lower limit frequency different and lower than the upper limit frequency.

In the present teachings, a primary vibration having a frequency content spanning a delivered frequency band means that the primary vibration has a frequency content containing several frequencies, including the upper and lower limit frequencies of the delivered frequency band. Preferably, such a primary vibration has a frequency content containing at least one additional frequency, and preferably several additional frequencies, between the upper and the lower limits of the delivered frequency band.

According to one embodiment, where the device comprises several actuators, the device can be configured such that several of said actuators provide each, to the body of the subject, a primary vibration having a single constant primary frequency, with the single constant primary frequencies not being all equal, but comprising several different single constant primary frequencies in the operative frequency range contained in a range from 5 Hz to 1000 Hz, preferably from 15 Hz to 200 Hz.

According to other embodiments, the device is configured such that the control unit controls at least one actuator, including only one, to provide a primary vibration having a frequency content spanning a delivered frequency band contained in, or overlapping, an operative frequency range contained in a range from 5 Hz to 1000 Hz.

In some embodiments, the delivered frequency band may span, between its upper and lower limit frequencies, at least 10 Hz, or at least 20 Hz, or at least 40 Hz, or at least 100 Hz, or at least 150 Hz, or at least 200 Hz, or at least 250 Hz, or at least 300 Hz, or at least 350 Hz, or at least 400 Hz, or at least 450 Hz, or at least 500 Hz.

In some embodiments, the delivered frequency band may span between its upper and lower limit frequencies, less than 500 Hz, or less than 450 Hz, or less than 400 Hz, or less than 350 Hz, or less than 300 Hz, or less than 250 Hz, or less than 200 Hz, or less 150 Hz, or less than 100 Hz, or less than 40 Hz, or less than 20 Hz, or less than 15 Hz, or less than 10 Hz.

In some embodiments the delivered frequency band may span at least from 15 Hz to 80 Hz or at least 15 Hz to 200 Hz, or at least from 30 to 100 Hz, or at least from 80 Hz to 250 Hz, or at least from 200 Hz to 500 Hz, or at least from 15 to 500 Hz.

Figure 6A:
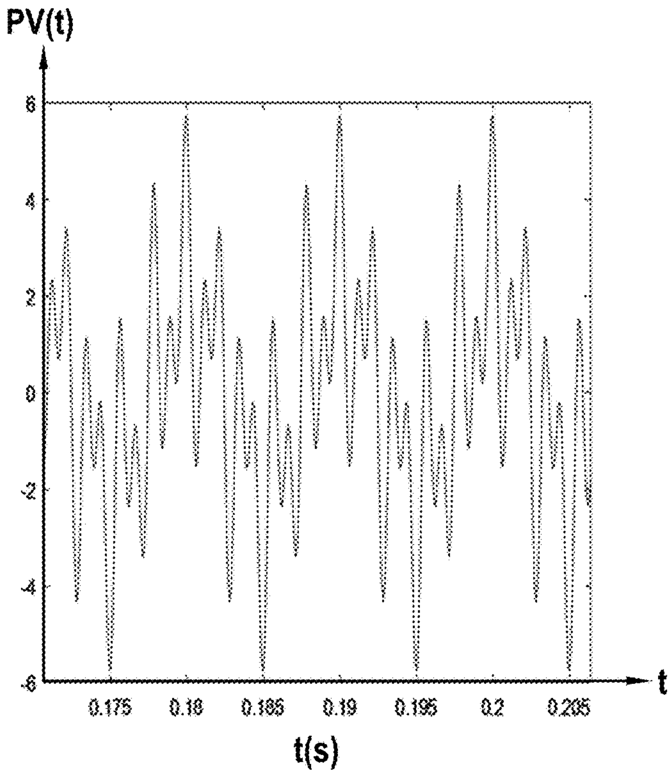
FIGS. 6A, 6B and 6C are similar to FIGS. 5A, 5B and 5C, but in relation to another example of a primary vibration which is the summation of several sine or cosine functions each exhibiting a different frequency, according to some embodiments of the present teachings.

FIG. 6A shows an example of a primary vibration which, during a given burst, is a summation of several distinct periodic sub-vibrations, several of which each have a distinct primary frequency, the several single primary frequencies being contained in the operative frequency range and spanning the delivered frequency band. In this example, the primary vibration is the summation of 3 sub-vibrations, each sub vibration is the cosine vibration, such that the primary vibration can be written under the following time function $$PV(t)=A*\cos(2*\pi*f1*t+\varphi)+A*\cos(2*\pi*f2*t+\varphi)+A*\cos(2*\pi*f3*t+\varphi)$$

where, for example:

f1=100 Hz f2=500 Hz, and f3=900 Hz.

In this example, the amplitudes A of each sub vibration are equal, but different amplitudes could be possible for different sub-vibrations. Also, in this example, the sub-vibrations have the same phase, but different phases could be possible for different sub-vibrations. In this example, the sub-vibrations occur simultaneously. In this example, it is contemplated that the primary vibration shown in FIG. 6A is provided by one actuator controlled by a control signal having the shape as shown in FIG. 6A. However, a device as described above having several actuators each providing a primary vibration having a single different primary frequency would in fact provide, from the perspective of the device as a whole, a primary vibration, understood as a global device primary vibration, having a similar frequency content. It is to be noted that FIG. 6A shows only a part of a primary vibration having a burst duration of for example 1 second.

Figure 6B:
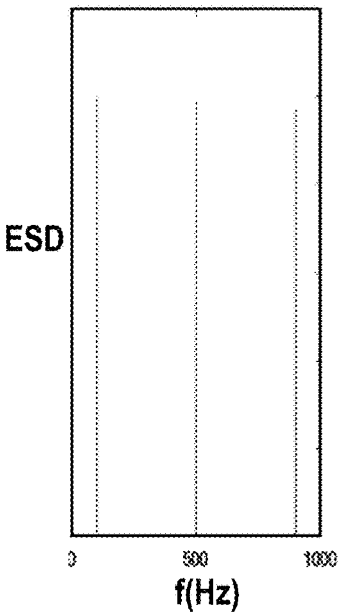
Figure 6C:
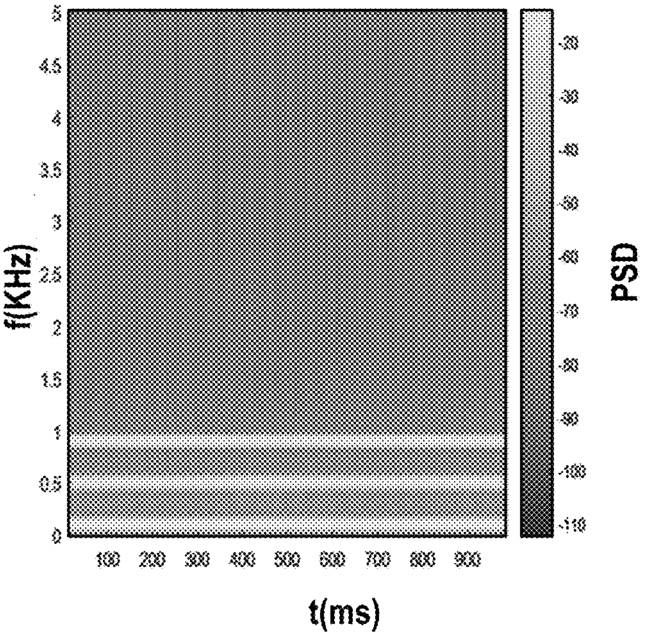

FIG. 6B shows that such primary vibration has an energy spectral density where all the energy is concentrated at the 3 frequencies corresponding to each of the 3 sub-vibrations. FIG. 6C shows that for each of those 3 frequencies, the power remains constant during a burst, which in this example may have a burst duration of 1 second.

Figure 7A:
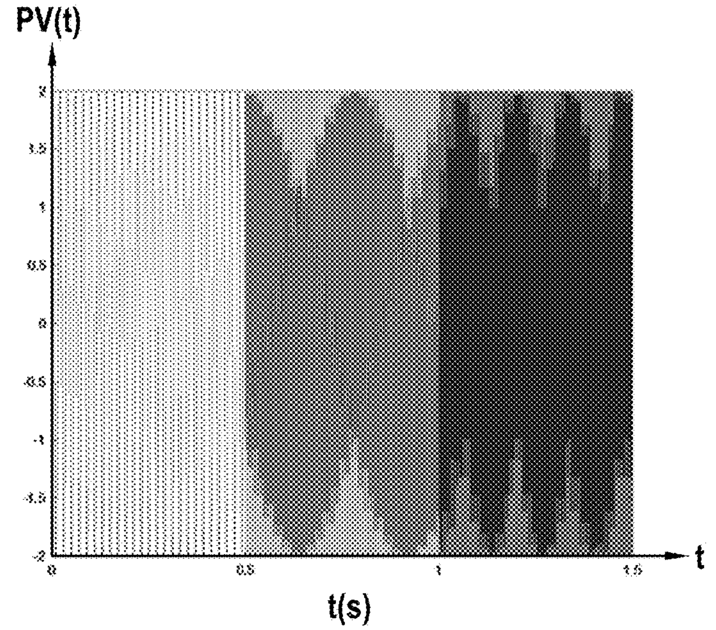
FIGS. 7A, 7B and 7C are similar to FIGS. 5A, 5B and 5C, but in relation to another example of a primary vibration which has a stepwise varying frequency spanning a delivered frequency band during a burst, according to some embodiments of the present teachings.

FIG. 7A shows another example of a primary vibration which has a frequency content spanning a delivered frequency band contained in an operative frequency range contained in a range from 5 Hz to 1000 Hz. This primary vibration, within each of several distinct time intervals [ti; ti+1], is a periodic vibration Pvi(t) which has a single primary frequency fi, the several single primary frequencies being distinct between two successive time intervals, being contained in the operative frequency range, and spanning the delivered frequency band. During such a given interval, the periodic vibration may be for example in the form $$PVi(t)=A*\cos(2*\pi*fi*t+\varphi).$$

In the example, there are three of such successive time intervals within a given burst, corresponding each to a given primary frequency:

f1=50 Hz f2=250 Hz, and f3=500 hz.

In this example, the amplitudes of each periodic vibration Pvi(t) are equal, but different amplitudes could be possible for different time intervals. Also, in this example, the periodic vibration Pvi(t) for the different time intervals have the same phase, but different phases could be possible for different time intervals. In this example, it is contemplated that the primary vibration shown in FIG. 7A is provided by one actuator controlled by a control signal having the shape as shown in FIG. 7A. However, a device as described above having several actuators each providing a periodic vibration Pvi(t) during one or several of the different time intervals during a given burst would in fact provide, from the perspective of the device as a whole, a primary vibration, understood as a global device primary vibration, having a similar frequency content over the duration of the burst.

Figure 7B:
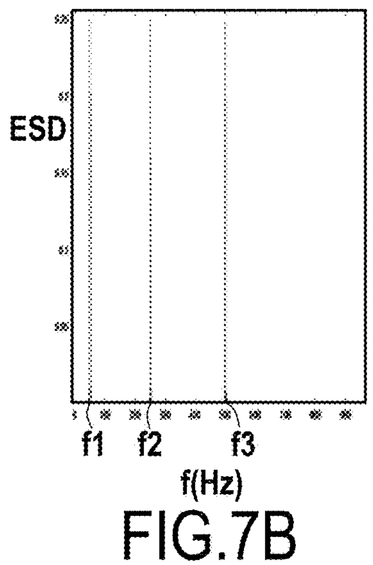
Figure 7C:
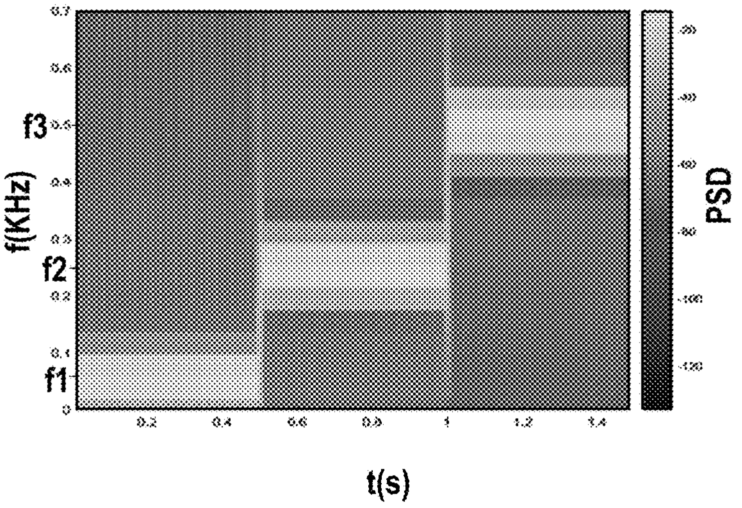

FIG. 7B shows that such primary vibration has an energy spectral density where all the energy is concentrated at the 3 frequencies corresponding to each of the 3 periodic vibration Pvi(t). FIG. 7C shows that for each of those 3 frequencies, the power of the primary vibration is constant over time during each of the time intervals, and also constant over time for the different intervals, but that the power can attributed to a frequency which varies in a step wise manner over time, each step variation corresponding to the end or beginning of one of said time intervals. The time intervals [ti; ti+1] are, in this example, of equal duration, but could exhibit different durations. FIGS. 7A and 7C show a primary vibration having a burst duration of for example 1.5 second.

Figure 8A:
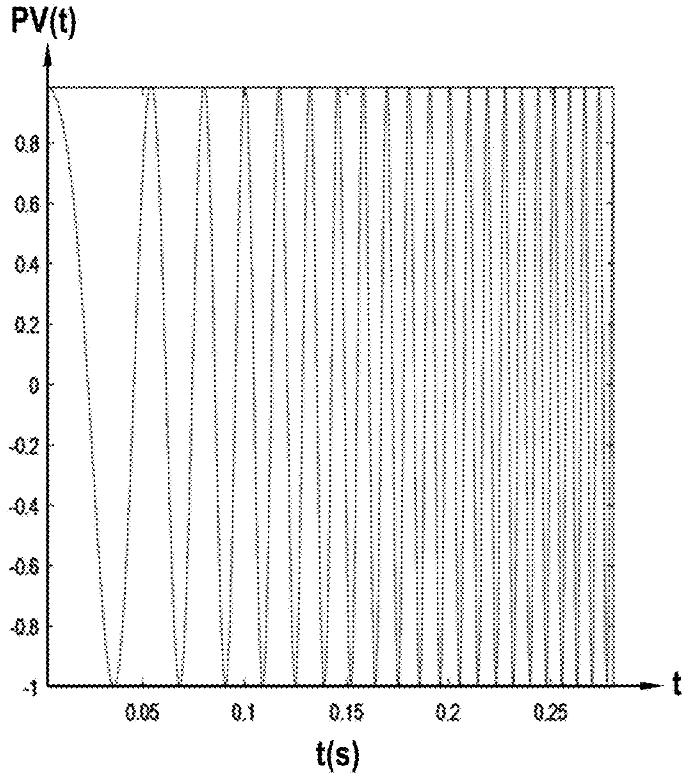
FIGS. 8A, 8B and 8C are similar to FIGS. 5A, 5B and 5C, but in relation to another example of a primary vibration which has a continuously varying frequency spanning a delivered frequency band during a burst, according to some embodiments of the present teachings.

FIG. 8A shows an example of a primary vibration which is a sweeping vibration having a varying frequency which, during a given time interval, has a frequency spanning the delivered frequency band. Such type of signal is sometimes called a chirp signal. In the shown example, the time interval is a burst, but it could be a time interval smaller than the duration of the burst and contained in a burst. Typically, the sweeping vibration may have a frequency, understood in this case as being an instantaneous frequency, which, during a given time interval, varies as a function of time, for example as a continuous function of time. In the shown example, during a given time interval, here corresponding to a burst, the amplitude of the primary vibration can be written as a the following time function:

$$PV(t)=A*\sin(2*\pi*F(t)+\varphi)$$

with

A: vibration amplitude;

t: time;

φ: vibration phase

In such a function, it can be defined an instantaneous frequency f(t) as being correlated to the time derivative F'(t) of the function F(t), more precisely with f(t)=(½*π)*F'(t) in this example. In a sweeping signal over a time interval, the instantaneous frequency f(t) is a non-constant function of time.

In the example, the sweeping signal is a linear sweeping signal, or linear chirp, where the instantaneous frequency f(t) is a linearly varying function of time which can be written f(t)=f0+kt.

One may choose k=(f1−f0)/Ti, where

Ti is the duration of the time interval;

f0 is the instantaneous frequency at the beginning of the time interval;

and f1 is the instantaneous frequency at the end of the time interval.

In such a case, F(t) is of the type $$F(t)=k/2t^2+f0t.$$

In such a sweeping vibration, the delivered frequency band is the band of frequencies starting from the instantaneous frequency f0 at the beginning of the time interval to the instantaneous frequency f1 at the end of the time interval.

Figure 8B:
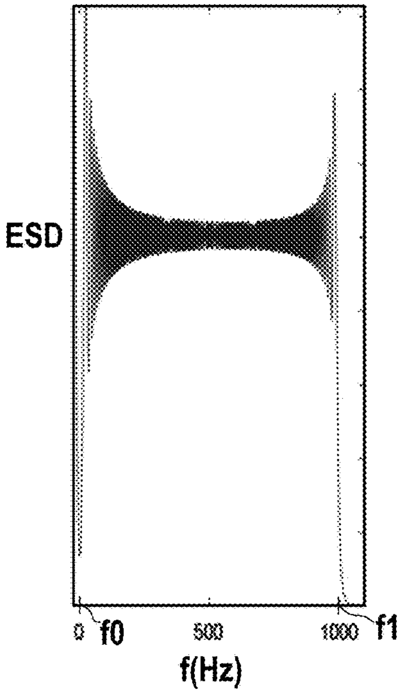
Figure 8C:
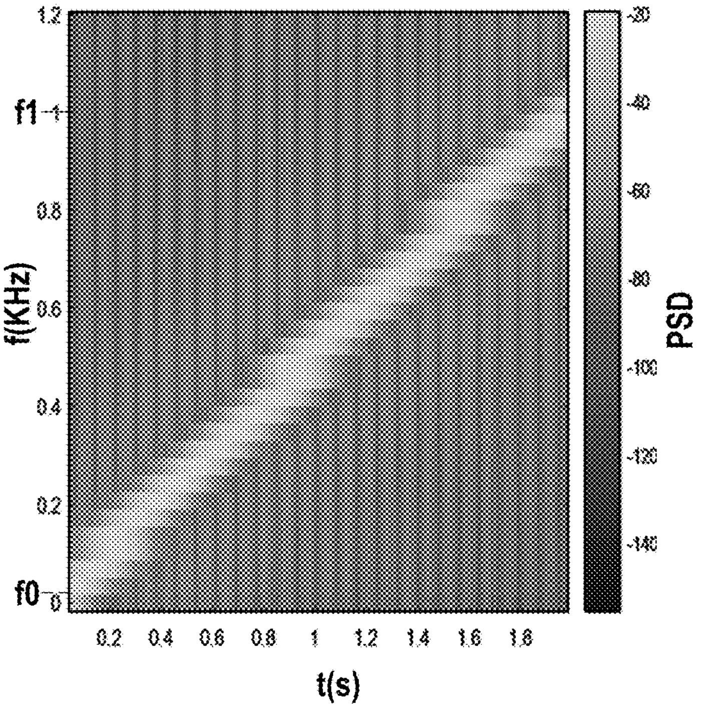

FIG. 8B shows the energy spectral distribution of such a sweeping vibration (or chirp signal) having a delivered frequency band ranging from a start frequency f0 of 5 Hz to an end frequency f1 of 1000 Hz. In the graph, the oscillations around the start and end frequencies correspond to the influence of harmonics which are inherently present in such a vibration signal. FIG. 8C shows that, in this case of a linear sweeping vibration, the power of the primary vibration is equally distributed over time, but that the power can attributed to a frequency which varies, here linearly, over time. It is to be noted that FIG. 8A shows only a part of a primary vibration having a burst duration of for example 2 seconds, as shown in FIG. 8C.

Figure 9A:
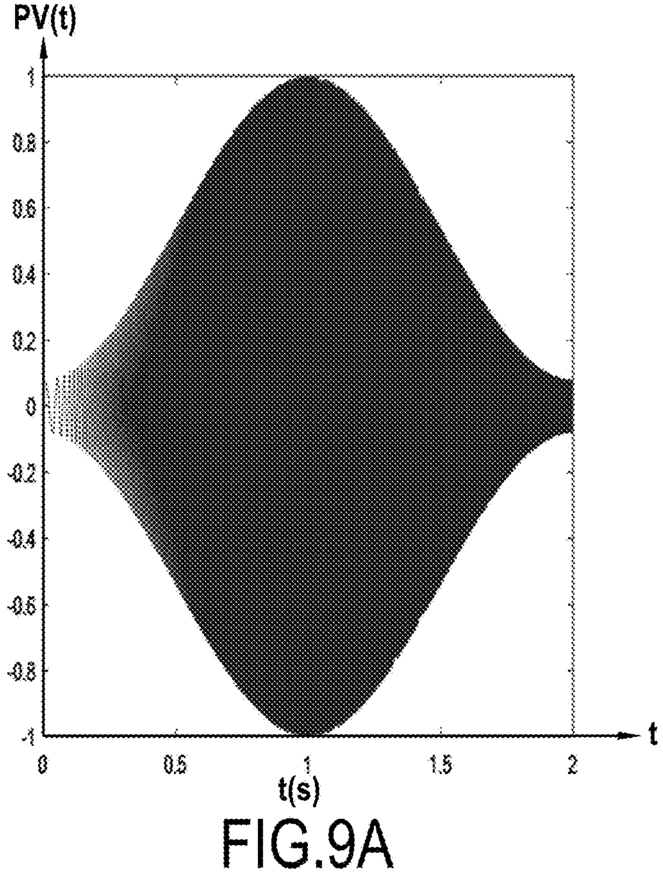
FIGS. 9A, 9B and 9C are similar to FIGS. 5A, 5B and 5C, but in relation to another example of a primary vibration which has a continuously varying frequency spanning a delivered frequency band during a burst, and which has also varying amplitude during a burst, for example by applying a hamming window function to the amplitude during a burst, according to some embodiments of the present teachings.
Figure 9B:
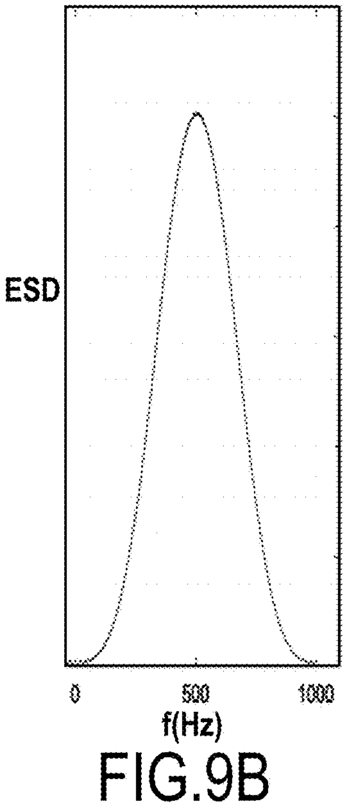
Figure 9C:
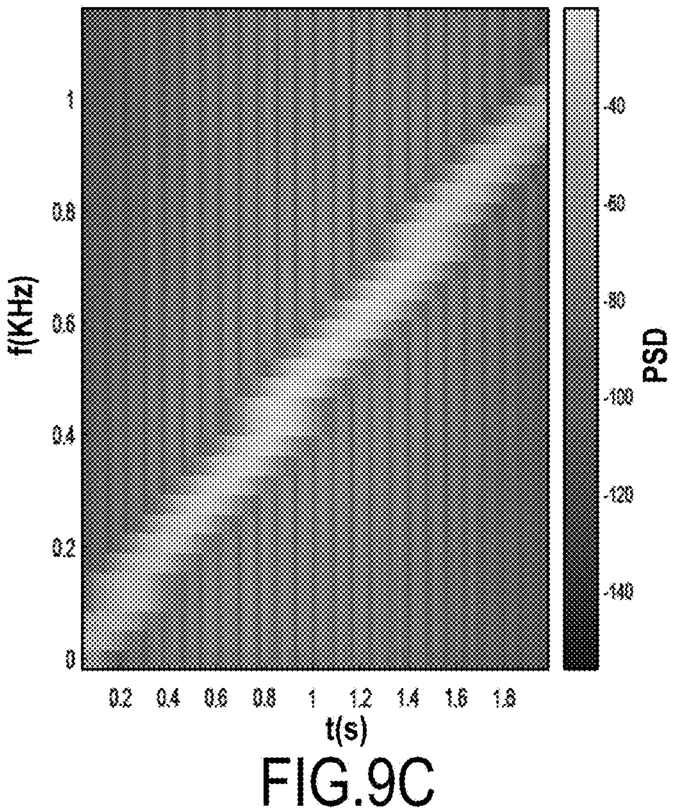

FIG. 9A shows a variant where a hamming window is applied to a time function as described for the previous example having a sweeping frequency. Therefore, the maximum amplitude of the primary vibration varies over time during a given time interval, which can be the duration of a burst. In the example, the variation is in the shape of a bell. FIG. 9B shows that, in the frequency domain, the energy of the primary vibration during a burst varies, also with a bell shaped variation having a maximum at a median frequency (500 Hz in the example). FIG. 9C shows that the power of the primary vibration varies over the time, and that the power can be attributed to a frequency which varies, here linearly, over time. FIGS. 9A and 9C show a primary vibration having a burst duration of for example 2 seconds.

Figure 10:
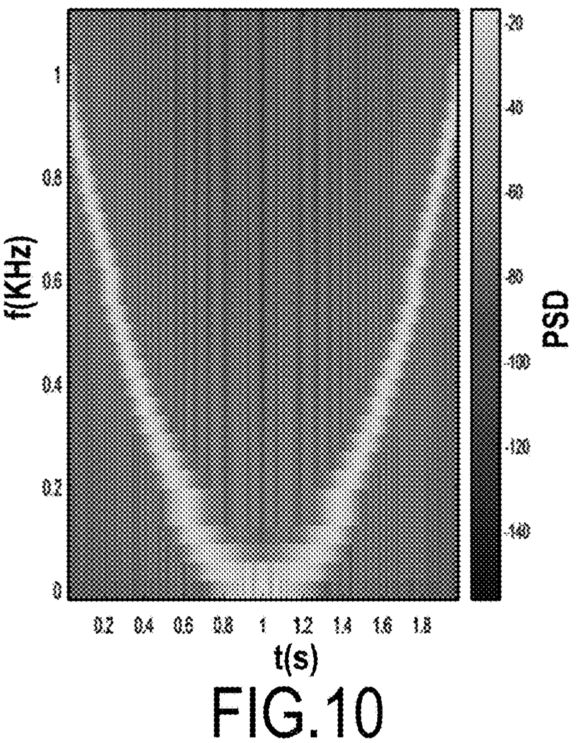
FIGS. 10, 11 and 12 are similar to FIG. 9C, but in relation to other examples of a primary vibration which have a continuously varying frequency spanning a delivered frequency band during a burst, and which have also varying amplitude during a burst, for other window functions applied to the amplitude, namely a quadratic concave, a quadratic convex, and an exponential.
Figure 11:
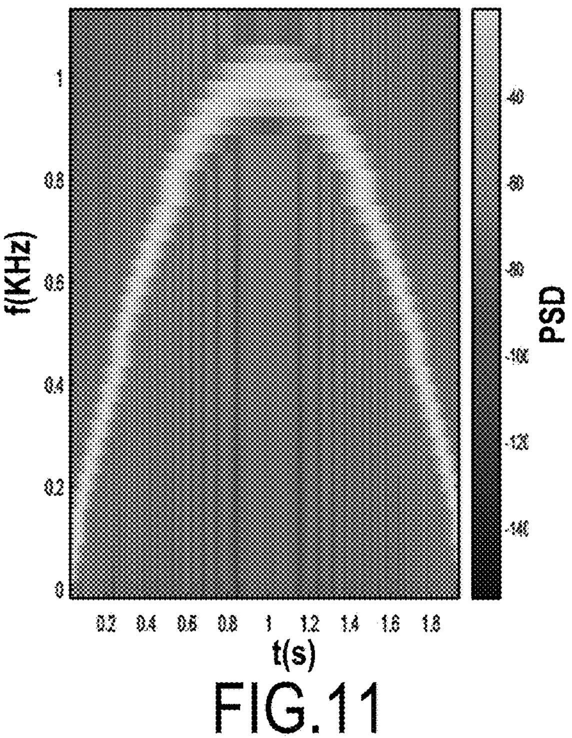
Figure 12:
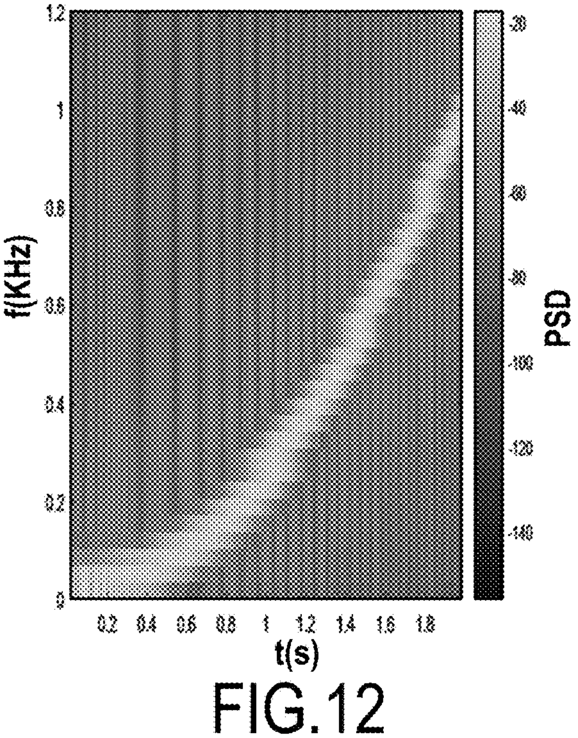

FIG. 10, FIG. 11 and FIG. 12 show further variants of the example of FIG. 8C where the primary vibration has a sweeping vibration having a varying frequency. Instead of having the frequency varying as a linear function of time, as in the example if FIGS. 8A to 8C, the frequency variation can follow a concave quadratic function of time in the example of FIG. 10, a convex quadratic function of time in the example of FIG. 11, or an exponential type variation as a function of time in the example of FIG. 12. In this latter case, the sweeping vibrations may have an exponentially varying instantaneous frequency f(t) of the type $$f(t)=f0k\hat{}t, \text{ with}$$

$$k=(f1/f0)\hat{}(1/Ti)$$

$$F(t)=f0[(k\hat{}t)-1]/\ln(k).$$

Figure 13A:
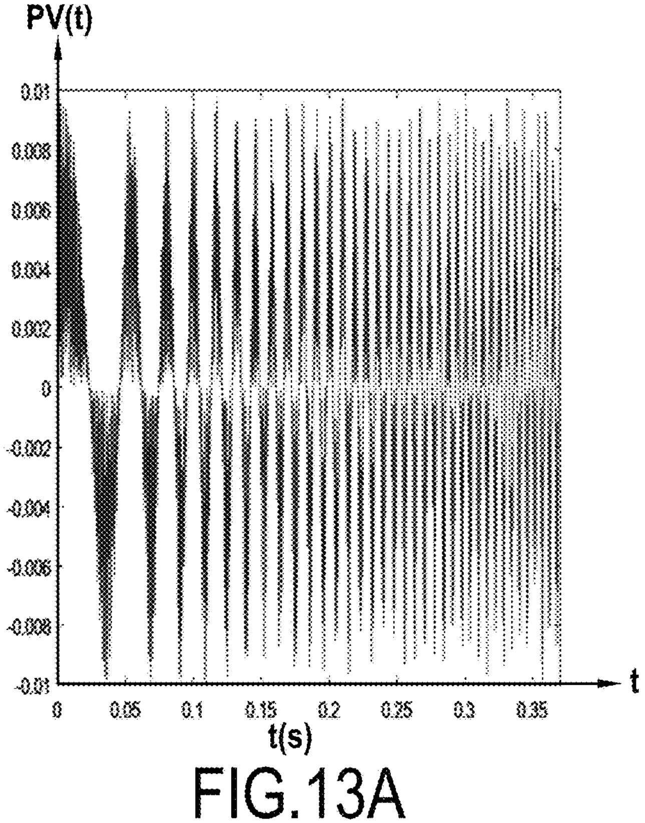
FIGS. 13A, 13B and 13C are similar to FIGS. 5A, 5B and 5C, but in relation to another example of a primary vibration which has a continuously varying frequency spanning a delivered frequency band during a burst, and which has also noise, here represented as a superposed white noise, according to some embodiments of the present teachings.
Figure 13B:
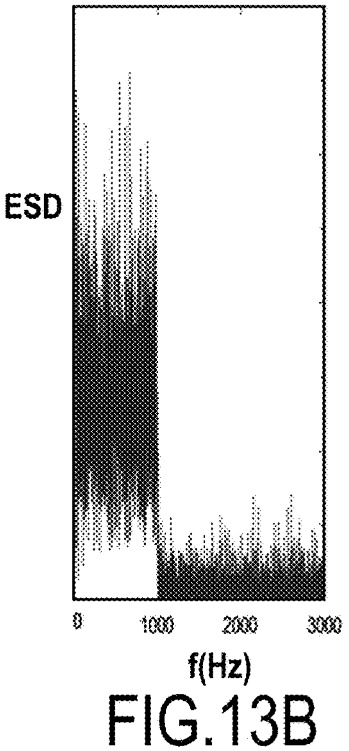
Figure 13C:
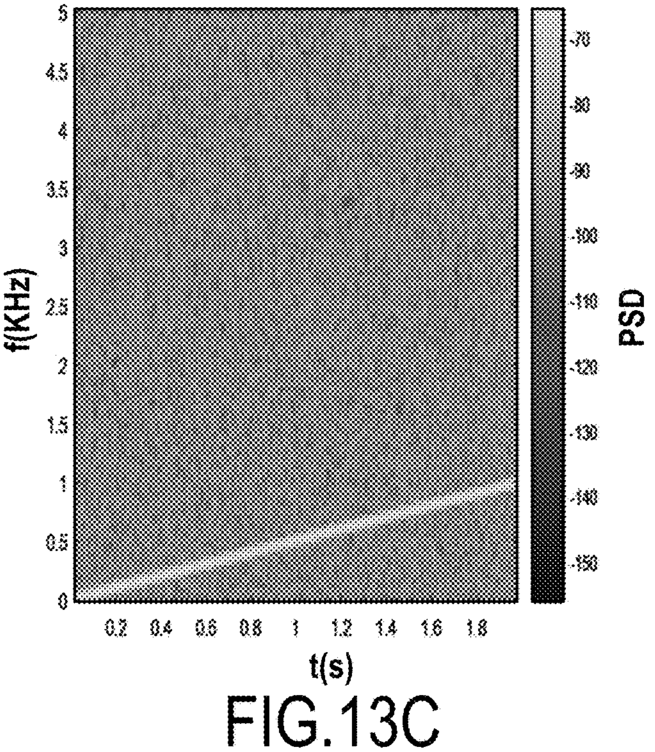

The example shown in FIG. 13A is that of a primary vibration having a sweeping vibration, thus having a varying frequency, but where, voluntarily or not, a noise function is added, here a white noise function. FIG. 13B shows the energy spectral distribution of such a base sweeping vibration (or chirp signal) having a delivered frequency band ranging from a start frequency f0 of 5 Hz to an end frequency f1 of 1000 Hz, over which a white noise signal is added. In the graph of FIG. 13B, the oscillations correspond mainly to the influence of the noise, but also that of the harmonics which are inherently present is such a vibration signal. FIG. 13B shows that the energy levels are predominant in the band of frequencies ranging from the start frequency to the end frequency of the base sweeping vibration. However, FIG. 13B also shows that the noise part of the vibration also contributes energy at frequencies over 1000 Hz. However, such energy of frequencies above 1000 Hz is deemed to be non-operative, because it is known that the corresponding waves cannot propagate very far inside the body of the subject. Such energy of frequencies above 1000 Hz could only have a significant influence at the skin surface or at depth of less than 10 millimeters from the skin surface. FIG. 13C shows that, in this case of a linear sweeping vibration superposed with a white noise, the power of the primary vibration is equally distributed over time, but that the power can attributed, at each point in time, predominantly to an instantaneous frequency which varies, here linearly, over time. It is to be noted that FIG. 13A shows only a part of a primary vibration which may having a burst duration of for example 2 seconds as shown on FIG. 13C.

The devices and methods may implement primary vibrations having still other frequency contents, including a combination of the frequency contents described above.

The amplitude of a primary vibration, which corresponds to the maximum displacement of the surface tissues of the body in contact with a contact pad, may be comprised within a range from 1 micrometer to 1000 micrometers, preferably from 10 micrometers to 500 micrometers.

With the above primary vibrations, experiments have shown that a shear wave may be generated inside the subject, and may propagate to an internal anatomical site of interest, having an amplitude larger than 5 micrometers, preferably larger than 10 micrometers, more preferably larger than 50 micrometers, still more preferably larger than 100 micrometers, still more preferably larger than 200 micrometers, most preferably larger than 500 micrometers, at said internal anatomical site.

In some embodiments, a treatment may contain one burst. In some embodiments, the one burst has a burst duration equal to the time of treatment. In some embodiments, a burst duration may be from 0.5 seconds to 60 seconds. In some embodiments, a burst duration may be from 1 second to 10 second.

In some embodiments, a treatment duration may be from 1 minute to 300 minutes. In some embodiments, a treatment duration may be from 5 minutes to 20 minutes. In some embodiments, a treatment can comprise one burst train. In some embodiments, a treatment can comprise several burst trains, comprising at least two burst trains. In some embodiments, the two at least burst trains are either immediately successive or are separated by a lapse period.

Use

In another aspect, the present teachings relate to methods of using a device of the present teachings, and more generally to treatment methods which may be implemented using such a device or using different devices. In some embodiments, the method includes treating a subject suffering from a breathing-related sleep disorder. In some embodiments, the method includes treating a subject suffering from a respiratory failure in the upper airway, the trachea, the lung, or the diaphragm. In some embodiments, the method includes treating a subject suffering from one or more of a chronic lung disease, a sleep disorder, ALS, COPD, cystic fibrosis, a neuromuscular disease, asthma, obesity, snoring, type-II diabetes, or congestive heart failure. In some embodiments, the method includes treating a subject suffering from snoring. In some embodiments, the method includes treating a subject suffering from OSA. In some embodiments, the method includes treating a subject suffering from UARS. In some embodiments, the method includes treating a subject suffering from OHS.

Besides the above uses, the present teachings can have a wide variety of other applications (e.g., any links between the lung and the heart failure as the left heart fraction ejection, any links relating to the perfusion and lung diffusion, or in general any type of muscle, tissues which could be in resonance or stimulated by the shear waves). One with ordinary skills in the art would be able to use the proposed technology in various applications without deviating from the present teachings in substance and spirit. And these applications are all within the scope of the present teachings.

In some embodiments, the method includes providing a primary vibration. In some embodiments, the method includes applying a primary vibration to an external anatomical site, including at least a first external anatomical site in view of generating inside the subject, at or up to an internal anatomical site including at least a first internal anatomical site, a shear wave.

It has been shown by the experiments detailed below that the method induces a physiological change in the subject in response to the shear wave. The physiological change includes a relief in the disorder to be treated. Typically, in the case of a breathing-related sleep disorder, the physiological change includes an improvement of at least one of:

the respiratory air flow rate,
the blood oxygen saturation,
the blood carbon dioxide pressure (PCO2)
the respiratory rate,
the heart rate,
the tidal volume.

As will be apparent from the experiments described below, it has appeared surprisingly that the physiological change remains for a remanence duration after the provision of any primary vibration has been stopped.

As detailed above, the method has proven to be most effective when the primary vibration has one or several frequencies, or a frequency varying, within an operative frequency range contained in a range from 5 Hz to 1000 Hz. In some instances, the operative frequency range is rather contained in a range from 15 Hz to 200 Hz.

The method thus involves providing primary vibrations having one or the other of the various frequency contents described and discussed above in relation to the device. Especially, as discussed above, the primary vibration has, in some embodiments of the method, a frequency content spanning a delivered frequency band contained in, or overlapping, the operative frequency range.

In some embodiments, the method includes applying a primary vibration to one location of the first external anatomical site. In some embodiments, the method includes applying a primary vibration at several locations of the first external anatomical site, for example by the use of a device having several actuators, each actuator being applied to one of the said several locations of the first external site.

For example, the method may provide at least one burst of at least one first primary vibration to the subject by external contact of at least one actuator with a first location of a first external anatomical site the subject, and simultaneously provide at least one burst of at least one second primary vibration to the subject by external contact of at least one actuator with a second location of said first external anatomical site the subject. In such a case, the first and second primary vibrations may exhibit a phase shift. Such phase shift may be achieved using several actuators and applying time delays between the vibratory movements imparted by different actuators to different contact pads. Without limiting the present teachings to any particular hypothesis or theory, such phase shift may result in focusing energy of the primary vibrations at the given first internal anatomical site.

In some embodiments, the method includes applying a primary vibration to a second external anatomical site, different from the first anatomical site, in view of generating inside the subject, at an internal anatomical site including at least a second internal anatomical site, a shear wave. In some embodiments, the method includes applying a primary vibration to one location of the second external anatomical site. In some embodiments, the method includes applying a primary vibration at several locations of the second external anatomical site, for example by the use of a device having several actuators, each actuator being applied to one of the said several locations of the second external anatomical site.

In some embodiments, an external anatomical site to which a primary vibration may be applied is one or several of the group consisting of the head, the nose, the mouth, the neck, the chest, the back, the thoracic walls, and the abdomen.

In some embodiments, the method includes focusing a shear wave to an internal anatomical site, including a first internal anatomical site and/or a second internal anatomical site.

In some embodiments, an internal anatomical site at which a shear wave is generated or to which a shear wave propagates may be comprised in the group consisting of the soft palate;
the mastication muscles
the pharynx muscles
the larynx muscles
the trachea;
the tongue;
the upper airway;
the epiglottis;
the alveolus;
the diaphragm;
a nerve, such as
  the phrenic nerve,
  the intercostal nerve
  the vague nerve
  the relaxation nerve;
  the hypoglossal nerve
a lung;
a vein
an artery (carotid, etc. . . . )
a blood system.
the cardiac system In some embodiments, the second internal anatomical site is substantially similar with the first internal anatomical site. In some embodiments, the second internal anatomical site is different from the first internal anatomical site.

In some embodiments, a method according to the present teachings includes providing a first vibration, where the provision of a first vibration is started manually, automatically, or a combination thereof. In some embodiments, the provision of a first vibration is started by the control unit upon receiving an input, for example an electric/electronic signal, from a switch which may be manually activated by a user of the system, for example the subject/patient or another person, such as a medical practitioner. In some embodiments, the provision of a first vibration is started by the control unit turning on automatically one or several actuators of the device. In some embodiments, the method includes providing a first vibration in the case where a first measurement is different from a reference. In some embodiments, the method includes providing a first vibration after a first duration during which a first measurement is different from a reference. In some embodiments, the first measurement is lower than the reference. In some embodiments, the first measurement is higher than the reference. In some embodiments, the first duration is a few seconds after any type of event of a respiratory anomaly (snoring or flow limitation or hypopnea, or apnea or desaturation or respiratory frequency or heart rate or Paco2 elevation . . . ) has been detected.

In some embodiments, the first measurement includes oxygen saturation or $SO_2$. In some embodiments, the first measurement includes blood oxygen saturation. In some embodiments, the first measurement is or includes $SaO_2$. In some embodiments, the first measurement is or includes $SvO_2$. In some embodiments, the first measurement is or includes $StO_2$. In some embodiments, the first measurement is or includes $SpO_2$. In some embodiments, the first measurement is or includes blood carbon dioxide pressure ($PCO_2$). In some embodiments, the first measurement includes respiratory air flow rate. In some embodiments, the first measurement is or includes oronasal thermal airflow rate measurement. In some embodiments, the first measurement is or includes nasal pressure. In some embodiments, the first measurement is or includes respiratory rate. In some embodiments, the first measurement is or includes tidal volume.

In some embodiments, the method includes stopping the first vibration. In some embodiments, the method includes stopping the first vibration, where the first vibration is stopped manually, automatically, or a combination thereof. In some embodiments, the first vibration is stopped by the control unit upon receiving an input, for example an electric/electronic signal from a switch which may be manually activated by a user of the system, for example the subject/patient or another person, such as a medical practitioner. In some embodiments, the first vibration is stopped by the control unit turning off one or several actuators automatically. In some embodiments, the method includes stopping a first vibration where a second measurement is different from a reference. In some embodiments, the method includes stopping a first vibration after a second duration when a second measurement is different from a reference. In some embodiments, the second measurement is lower than the reference. In some embodiments, the second measurement is higher than the reference. In some embodiments, the second measurement is similar with the reference. In some embodiments, the second duration is about few seconds after any type of events of a normal respiratory (snoring or flow limitation or hypopnea, or apnea or desaturation or respiratory frequency or heart rate or Paco2 elevation . . . ) has been detected.

In some embodiments, the second measurement includes oxygen saturation or $SO_2$. In some embodiments, the second measurement is or includes blood oxygen saturation. In some embodiments, the second measurement is or includes $SaO_2$. In some embodiments, the second measurement is or includes $SvO_2$. In some embodiments, the second measurement is or includes $StO_2$. In some embodiments, the second measurement is or includes $SpO_2$. In some embodiments, the second measurement is or includes blood carbon dioxide pressure or $PCO_2$. In some embodiments, the second measurement is or includes respiratory air flow rate. In some embodiments, the second measurement is or includes oronasal thermal airflow rate measurement. In some embodiments, the second measurement is or includes nasal pressure. In some embodiments, the second measurement is or includes respiratory rate. In some embodiments, the second measurement is or includes tidal volume.

In some embodiments, the reference is or includes a reference oxygen saturation or reference $SO_2$. In some embodiments, the reference is or includes a reference blood oxygen saturation. In some embodiments, the reference is or includes a reference $SaO_2$. In some embodiments, the reference is or includes a reference $SvO_2$. In some embodiments, the reference is or includes a reference $StO_2$. In some embodiments, the reference is or includes a reference $SpO_2$. In some embodiments, the reference is or includes a reference blood carbon dioxide pressure (reference $PCO_2$). In some embodiments, the reference is or includes a reference respiratory air flow rate. In some embodiments, the reference is or includes a reference oronasal thermal airflow rate measurement. In some embodiments, the reference is or includes a reference nasal pressure. In some embodiments, the reference is or includes a reference respiratory rate. In some embodiments, the reference is or includes a reference tidal volume.

In another aspect, the present teachings include a use of a device according to the present teachings, where the use is characterized by providing a first vibration, where the first vibration is started after a first duration during which at least one of the following occurs:

(i) $SO_2$ is lower than a reference $SO_2$, preferably,
  (a) $SaO_2$ is lower than a reference $SaO_2$,
  (b) $SvO_2$ is lower than a reference $SvO_2$,
  (c) $StO_2$ is lower than a reference $StO_2$, and/or
  (d) $SpO_2$ is lower than a reference $SpO_2$;
(ii) $PCO_2$ is higher than a reference $PCO_2$;
(iii) a respiratory air flow rate is lower than a reference respiratory air flow rate, preferably, the oronasal thermal airflow rate measurement is lower than a reference oronasal thermal airflow rate;
(iv) a nasal pressure is lower than a reference nasal pressure;
(v) a respiratory rate is lower than a reference respiratory rate; and/or
(vi) a tidal volume is lower than a reference tidal volume; and the first duration is between 0 seconds to 5 minutes.

In another aspect, the present teachings include a use a device according to the present teachings, where the use is characterized by stopping a first vibration after a second duration where, at least one of the following condition is met:

(i) $SO_2$ is not lower than a reference $SO_2$, preferably,
  (a) $SaO_2$ is not lower than a reference $SaO_2$,
  (b) $SvO_2$ is not lower than a reference $SvO_2$,
  (c) $StO_2$ is not lower than a reference $StO_2$, and/or
  (d) $SpO_2$ is not lower than a reference $SpO_2$;
(ii) $PCO_2$ is not higher than a reference $PCO_2$;
(iii) a respiratory air flow rate is not lower than a reference respiratory air flow rate, preferably, the oronasal thermal airflow rate measurement is not lower than a reference oronasal thermal airflow rate;
(iv) a nasal pressure is not lower than a reference nasal pressure;
(v) a respiratory rate is not lower than a reference respiratory rate; and/or
(vi) a tidal volume is not lower than a reference tidal volume; and the second duration is between 0 second to about 5 hours.

In some embodiments, a use of a device according to the present teachings includes an improvement in the respiratory air flow rate. In some embodiments, the improvement includes an improvement of the respiratory air flow rate of about 20% or above. In some embodiments, the improvement includes an improvement of the respiratory air flow rate of about 25% or above. In some embodiments, the improvement includes an improvement of the respiratory air flow rate of about 30% or above. In some embodiments, the improvement includes an improvement of the respiratory air flow rate of about 35% or above. In some embodiments, the improvement includes an improvement of the respiratory air flow rate of about 40% or above. In some embodiments, the improvement includes an improvement of the respiratory air flow rate of about 45% or above. In some embodiments, the improvement includes an improvement of the respiratory air flow rate of about 50% or above. In some embodiments, the improvement includes an improvement of the respiratory air flow rate about 55% or above. In some embodiments, the improvement includes an improvement of the respiratory air flow rate of about 60% or above. In some embodiments, the improvement includes an improvement of the respiratory air flow rate of about 65% or above. In some embodiments, the improvement includes an improvement of the respiratory air flow rate of about 70% or above. In some embodiments, the improvement includes an improvement of the respiratory air flow rate of about 75% or above.

The present teachings can be discussed in further details in connection with the present examples and the appended drawings. However, a person of ordinary skills in the art would understand that the examples and the appended drawings are intended to illustrate certain embodiments and not intended to represent the only forms in which the present teachings may be constructed or utilized.

Figure 14:
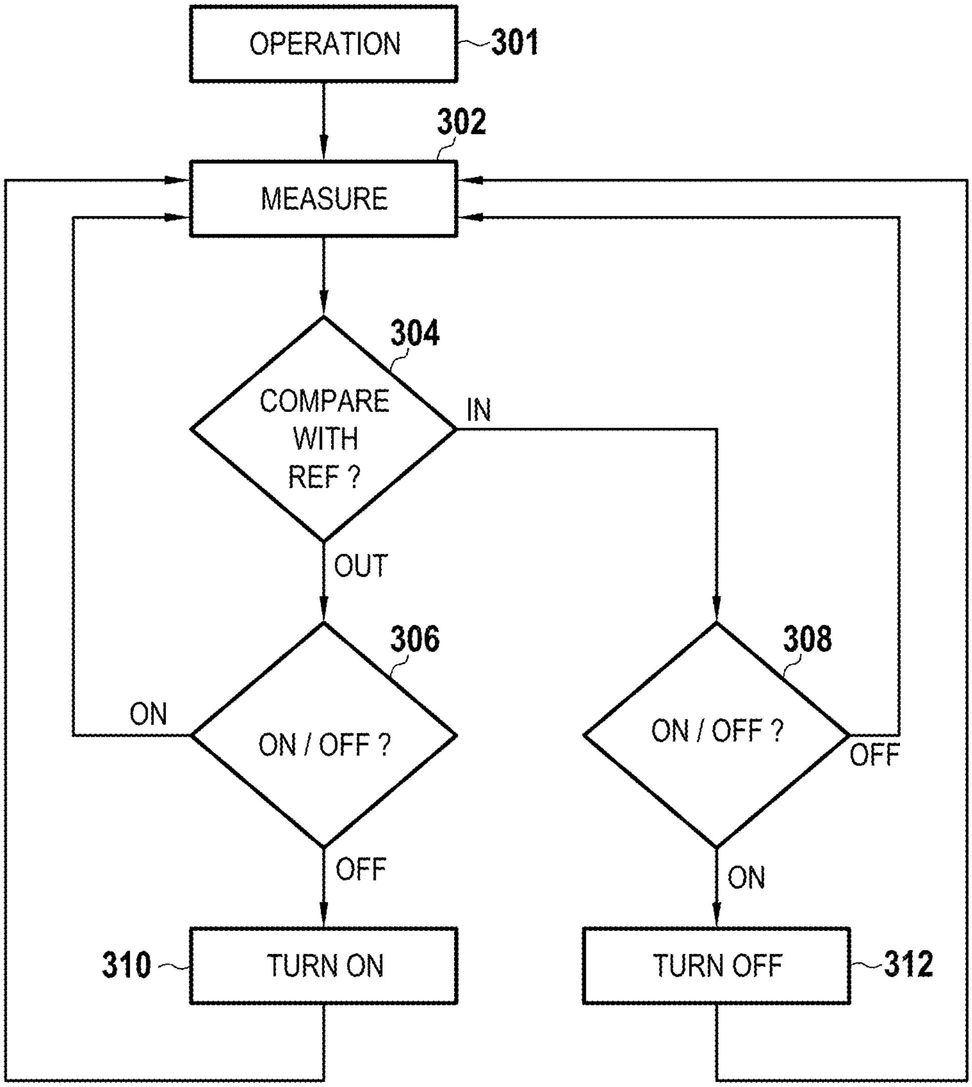
FIG. 14 is a diagram of a simplified method according to the present teachings.

FIG. 14 is a diagram of an example of a simplified method according to the present teachings. In such method, after a device of the present teachings is turned on or is in operation at step 301, a measurement of a physiological parameter of the subject is made at step 302. The measurement is received by the control unit, where the measurement is compared with a desired reference at step 304. If the measurement is outside of the desired reference, the control unit determines at step 306 whether the actuator is on or off. If the actuator is off at step 306, the control unit turns on the actuator at step 310 to provide a primary vibration (resulting in shear wave inside the subject), and resumes to step 302. If the actuator is on at step 306, the control unit maintains the actuator at the on position and resumes to step 302. If, at step 304, the measurement is inside the desired reference, the control unit determines at step 308 whether the actuator is on or off. If the actuator is on, the control unit turns off the actuator at step 312 and resumes to step 302. If the actuator is off, the control unit maintains the actuator at the off position at step 312 and resumes to step 302. This cycle maintains so that the device is controlled by the control unit triggered by the monitor.

EXPERIMENTS

Experiment 1. Upper Airways Mimicking Phantom

Figure 15:
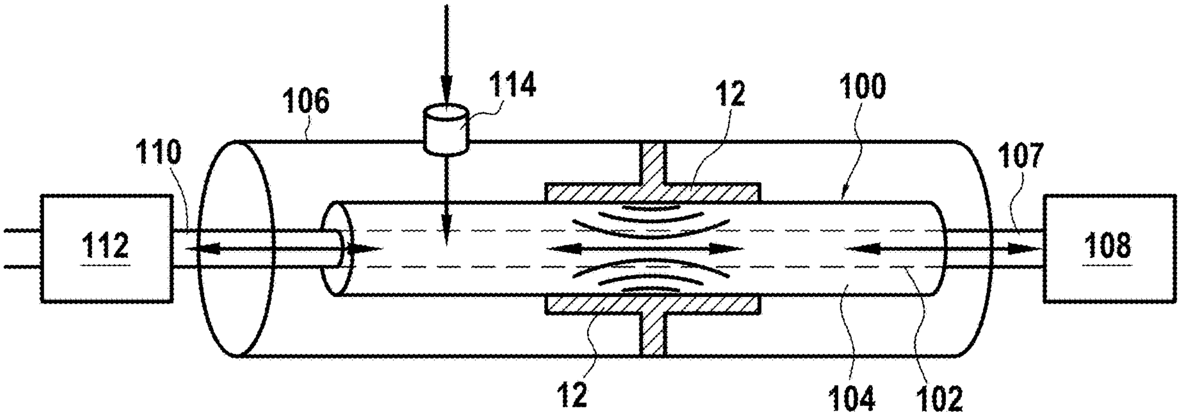
FIG. 15 and FIG. 16 are each respectively a schematic longitudinal and transverse view of a first experimental setup using a Polyinyl Alcohol (PVA) tissue mimicking phantom.
Figure 16:
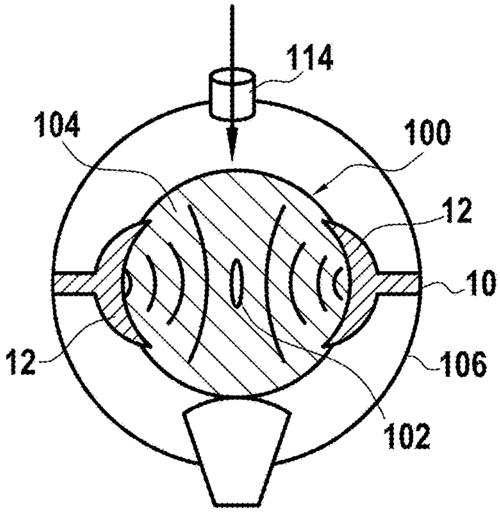

A PVA phantom 100, as shown in FIG. 15 and FIG. 16, used during this experiment is made of an aqueous solution of 5 to 10% of Polyvinyl Alcohol (PVA Sigma Aldrich, St. Louis, Missouri). In order to obtain an elastic phantom, the solution underwent from 2 to 5 freeze and thaw cycles depending on the desired final elasticity. The phantom 100 is tube shaped, with an internal longitudinal passage 102 surrounded by a thick wall 104 of elastic material, to mimic an upper airway of a human or animal subject.

The aim of the experiment was to put the PVA phantom 100 under external constraint in order to create an obstruction of its internal longitudinal passage 102, and then to show that it was possible to open it using shear waves, by applying primary vibrations to the phantom 100 as in the methods described above.

The tubular phantom 100 was thus placed in a gas tight enclosure 106. One extremity of the internal longitudinal passage of the phantom was connected by a first connecting tube 107 to a source of air 108 mimicking a lung, outside the enclosure. The source of air mimicking a lung was able to mimic a breath-in and a breath-out.

The other extremity of the internal longitudinal passage of the phantom was connected by a second connecting tube 110 to an air flow rate monitor 112, outside the enclosure. A Vivo® system, available from the applicant BREAS MEDICAL AB, FORESTASVAGEN 1, 43533 MOLNLYCKE, SWEDEN, (typically a Vivo 60) was used as an air flow rate monitor. Under atmospheric pressure in the enclosure, the lung mimicking air source 108 was thus able to cause the circulation, in the internal longitudinal passage 102 of the phantom, of a reference air flow.

Pressurized gas was then introduced 114 in the enclosure so as to increase, in the enclosure 106, the pressure surrounding the phantom 100, without affecting the pressure inside the internal longitudinal passage 102. The pressure was increased up to an obstructing pressure level causing the thick wall 104 phantom 100 to collapse and restrict the available cross-section in the internal longitudinal passage 102, and thus causing an obstruction of the air flow in the internal longitudinal passage 102.

Actuators 12 were provided inside the enclosure 106, in external mechanical contact with the outer wall surface of the thick wall 104. In fact, two actuators 12 were installed diametrically opposite on the periphery of the phantom 100, longitudinally in the center of the phantom. The actuators were piezo-electric actuators of the APA series from CEDRAT TECHNOLOGIES, 59 Chemin du Vieux Chêne, Inovallée, 38246 MEYLAN Cedex, France. A Primary vibration at 120 Hz was applied to the phantom via the actuators.

The shear wave propagation in the phantom and the entire mechanical changes due to shear wave propagation in the obstruction area were monitored with an ultrasound scanner (Verasonics® Vantage and a 5 MHz ultrasonic probe). The air flow rate variation in the internal longitudinal passage 102 was monitored with the air flow rate monitor 112.

The collapsed area in the PVA phantom was imaged with an ultrasonic scanner, so that the mechanical variation of the internal longitudinal passage 102 before and after the application of the obstructing pressure level was observed. The ultrasonic images and the measured air flow rate showed that the application of primary vibrations, generating a shear wave inside the phantom, was able to re-open the internal longitudinal passage 102 in the PVA phantom.

This first result obtained in a controlled environment, on a purely physical model, demonstrates the effectiveness of a method comparable to the inventive method to open a PVA phantom collapsed due to external constraint. It can be noted that, in this purely physical experiment, no physiological or biological mechanism can have a role.

Experiment 2. Pig In Vivo Tests

In different tests in this experiment, a pig was provided laid down on its back with its stomach upwards. A device as described above was applied at the neck region and a $SPO_2$ monitor was provided on the tail of the pig. Different tests were conducted, with different devices including devices such as those of FIG. 1 and of FIG. 2, and with different pigs of difference size and weight. For each test, the pig was placed in a position to induce snoring and/or flow limitation and/or Hypopnea and/or apnea. The position is to have the head of the pig in a lightly tilted in order to induce an air flow limitation or obstruction. After snoring and/or flow limitation and/or Hypopnea and/or apnea were induced, a method as described above was applied and the respiratory air flow rate and $SPO_2$ were monitored.

Figure 17:
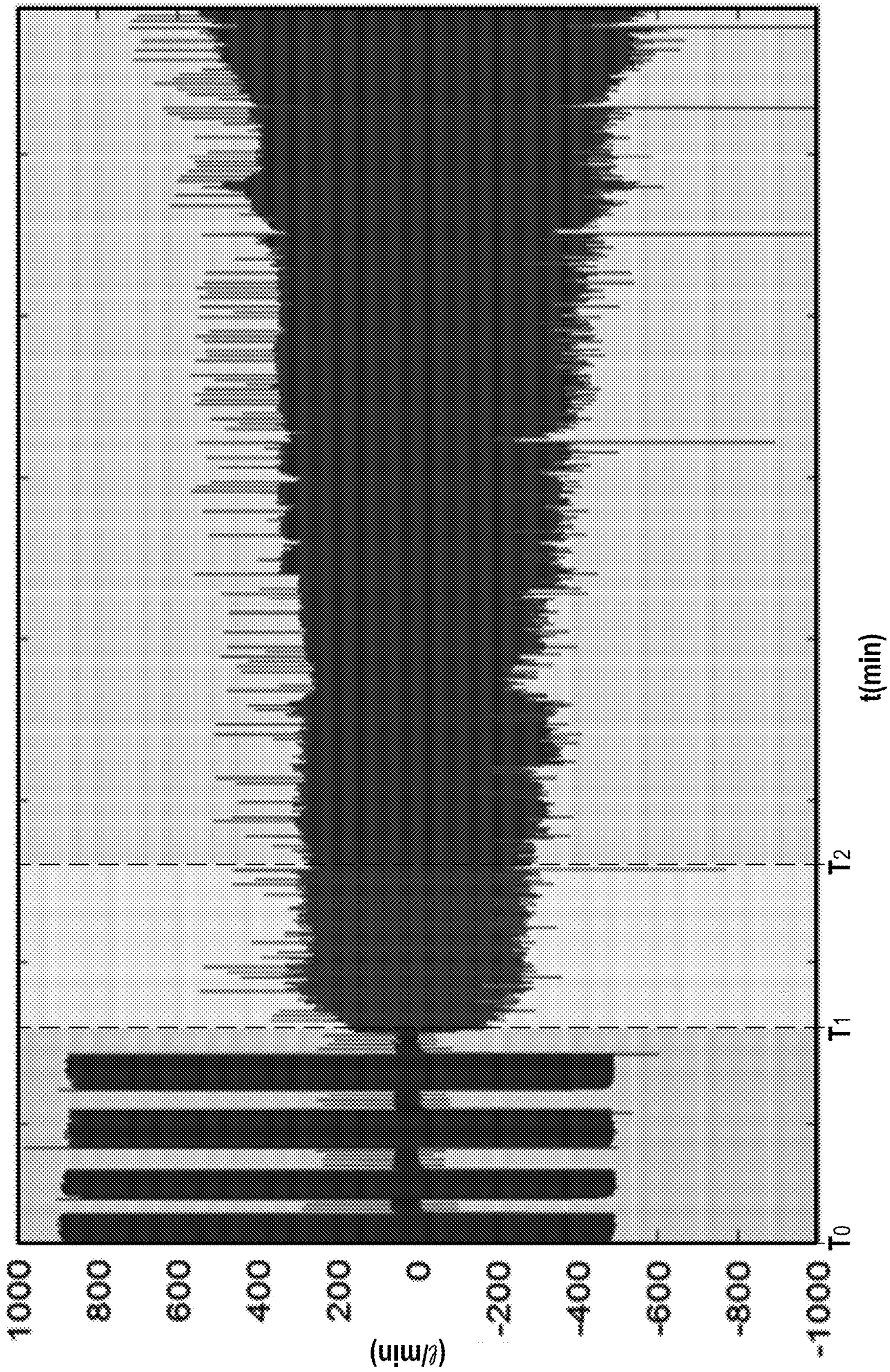
FIG. 17 and FIG. 18 show exemplary air flow and SpO2 in response to the application of a method using some embodiments of the present teachings in treating an animal model.
Figure 18:
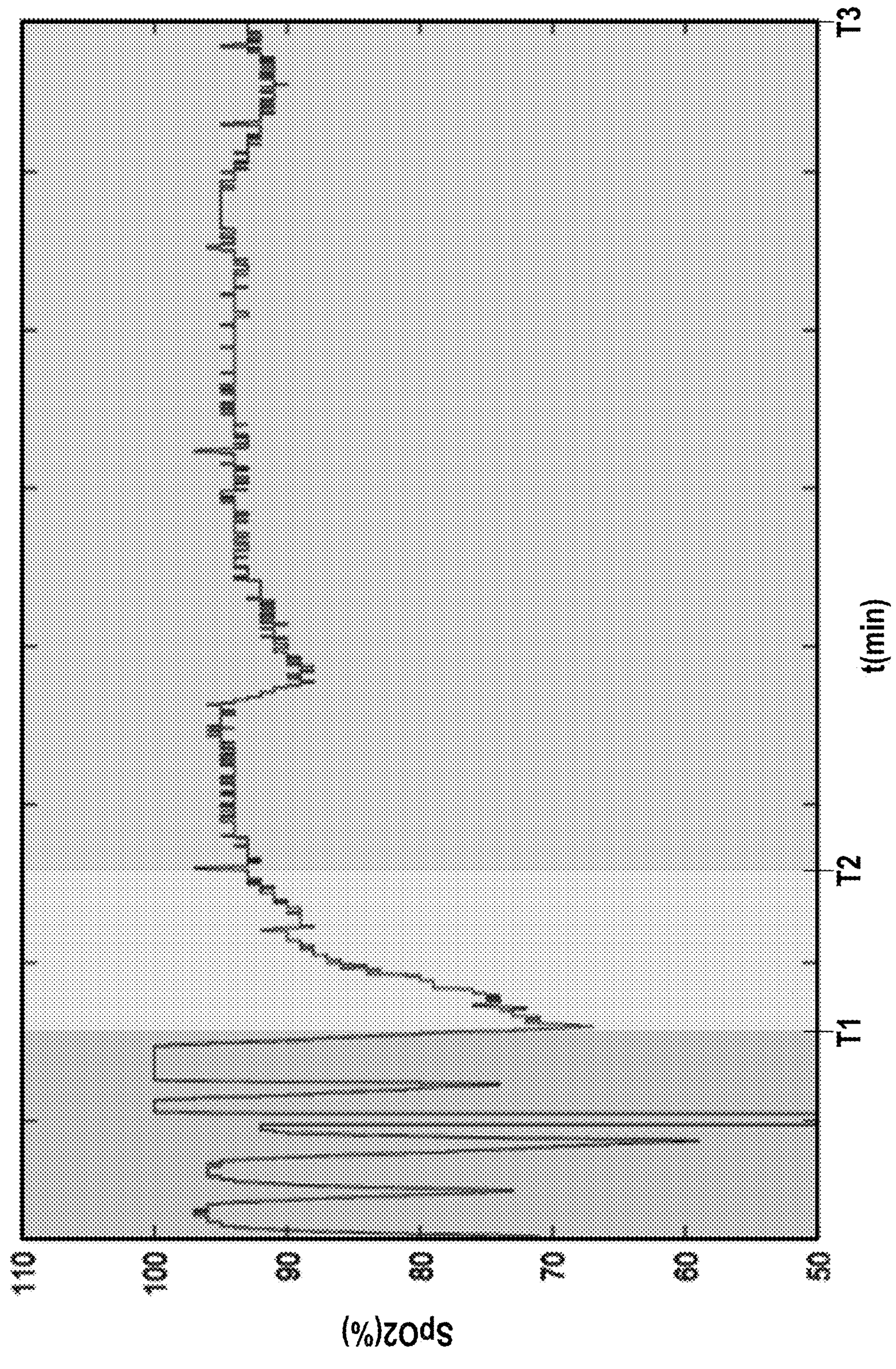

FIG. 17 and FIG. 18 show the results of a test which was typical of this experiment. FIG. 18 illustrates the respiratory air flow rate of the subject expressed in liters per minute, over time. FIG. 18 illustrates, during the same test, the measured SPO2 of the subject. From a first time period, extending from time T0 to time T1, it was first verified whether the subject was able to have spontaneous re-breathing after a severe desaturation episode due to the induced breathing disorder. During this first time period, conventional ventilation treatment was applied and stopped 4 times. As can be seen on FIGS. 17 and 18, application of the ventilation treatment resulted of course in a high level of respiratory air flow rate and to SPO2 levels above 90%. However, each time the ventilation treatment was interrupted, the respiratory air flow rate fell below 50 liters per minute, and SPO2 fell rapidly well below 75%, including below 60%. Therefore, during a second period of time, extending from time T1 to time T2, a method according to the present teachings was applied, using a device according to the present teachings. In this specific test, primary vibrations were applied using a device according to FIG. 2 comprising several actuators. The primary vibrations were synchronous. They comprised a train of bursts having a burst duration of 2.5 seconds, with a sweeping frequency spanning the range of 40 to 200 Hz, with a continuous variation of the frequency during the burst as in the example of FIG. 8A. The duration of the treatment, extending from time T1 to time T2, corresponding to the burst train duration, was 8 minutes. FIG. 17 shows a first almost immediate effect of the application of the primary vibrations on the respiratory air flow rate which continues increasing to reach an almost steady level after approximately 2 to 3 minutes. In parallel, SPO2 measurements showed a steady increase from the value of less than 70% at time T1 corresponding to the beginning of the treatment, to a value exceeding 90% after approximately 5 minutes of treatment, and reaching approximately 94% at the end T2 of that 2$^{nd}$ period of time corresponding to the end of application of the primary vibrations. It is to be noted that, during the treatment, i.e. between times T1 and T2, no respiratory assistance was provided, especially no CPAP treatment was applied.

Most notably, it appears from FIGS. 17 and 18 that the physiological changes induced by the method and the device according to the present teachings have a remanence, meaning that physiological change is maintained for a certain duration after the treatment, and thus after the vibration has ceased. In this example, the remanence effect was maintained until the end of the measurements, until time T3, for thus the duration of 44 minutes. During that third period of time of the test, extending from time T2 to time T3, the respiratory air flow rate was maintained, after the end of the treatment, at a value at least equal or exceeding the value obtained at the end of the treatment at time T2. Similarly, SPO2 levels remained high, above approximately 85%, and even mostly over 90%, during this 3$^{rd}$ period of time of the test. Other tests have shown the same remanence effect, however with different durations, but in many case with a duration largely exceeding the duration of the application of primary vibrations.

While the present teachings have been described by means of specific embodiments and applications thereof, numerous modifications and variations could be made thereto by those skilled in the art without departing from the scope of the invention set forth in the claims.

The invention claimed is:

1. A device comprising a first actuator, and a control unit, wherein the first actuator is configured for external mechanical contact with the subject, wherein the control unit is configured to control the first actuator to provide at least one burst of a first primary vibration, wherein the first primary vibration has several frequencies within an operative frequency range contained in a range from 5 Hz to 1000 Hz, in order for the device to generate a shear wave inside the body of the subject, wherein the shear wave is generated and/or propagates at or up to a depth of at least 15 millimeters inside the body of the subject, wherein the first primary vibration has a frequency content spanning a delivered frequency band contained in, or overlapping, the operative frequency range contained in a range from 5 Hz to 1000 Hz, and wherein the first primary vibration is or contains a vibration which, during a given burst, is a summation of at least several distinct periodic sub-vibrations occurring simultaneously, several of which each have a distinct primary frequency, the several single primary frequencies being contained in the operative frequency range and spanning the delivered frequency band, wherein the device comprises subsets of actuators, each subset of actuators comprising several actuators, one subset of actuators including said first actuator, each actuator in each subset of actuators being configured for external mechanical contact with the subject, wherein the control unit is configured to control each actuator in each subset of actuators to provide at least one burst of primary vibrations, which are synchronous within a given subset and exhibit a phase shift between different subsets, and wherein each primary vibration has several frequencies within the operative frequency range contained in a range from 5 Hz to 1000 Hz.

2. The device of claim 1, wherein the operative frequency range is contained in a range from 15 Hz to 200 Hz.

3. The device of claim 1, wherein the control unit is configured to control the actuators to provide said at least one burst of the first primary vibration, wherein said burst has a burst duration, and to provide a train of several successive bursts of primary vibration, until the expiration of a burst train duration.

4. The device of claim 1, wherein the control unit is configured to turn on or off the actuators based on the measurement of at least one physiological parameter of a subject.

5. The device of claim 1, wherein the actuators are arranged on a holder in the form of at least one of:

a neck belt, a thoracic belt or vest, a diaphragmatic belt, an abdominal belt.

6. A method of treating a subject in need thereof, said method comprising providing at least one burst of at least one first primary vibration to the subject by external contact of at least one actuator with the subject, in order to generate a shear wave in the subject and to induce a physiological change in the subject in response to the shear wave, wherein the shear wave is generated and/or propagates at or up to a depth of at least 15 millimeters inside the body of the subject, wherein the first primary vibration is or contains a vibration which, during a given burst, is a summation of at least several distinct periodic sub-vibrations, several of which each have a distinct primary frequency, the several single primary frequencies being contained in the operative frequency range and spanning the delivered frequency band wherein the device comprises different subsets of actuators, each subset of actuators comprising several actuators, one subset of actuators including said first actuator, each actuator in each subset of actuators being configured for external mechanical contact with the subject, wherein the control unit is configured to control each actuator in each subset of actuators to provide at least one burst of primary vibrations, which are synchronous within a given subset and exhibit a phase shift between different subsets, and wherein each primary vibration has several frequencies within the operative frequency range contained in a range from 5 Hz to 1000 Hz.

7. The method of claim 6, wherein the first primary vibration has a frequency content spanning a delivered frequency band contained in, or overlapping, the operative frequency range.

8. The method of claim 7, wherein the first primary vibration is or contains a sweeping vibration having a varying frequency which, during a given time interval, has a non-constant frequency spanning the delivered frequency band.

9. The method of claim 7, wherein the delivered frequency band spans at least from 15 to 800 Hz.

10. The method of claim 6, wherein the physiological change remains for a remanence duration after the provision of any primary vibration has been stopped.

* * * * *